(12) United States Patent
Okano et al.

(10) Patent No.: US 9,714,017 B2
(45) Date of Patent: Jul. 25, 2017

(54) BRAKE CONTROLLER

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Takahiro Okano, Chiryu (JP); Akitaka Nishio, Kariya (JP); Yusuke Kamiya, Okazaki (JP); Masaaki Komazawa, Miyoshi (JP)

(73) Assignees: ADVICS CO., LTD., Kariya, Aichi-Pref. (JP); TOYOTA JIDOSHI KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/777,986

(22) PCT Filed: Mar. 7, 2014

(86) PCT No.: PCT/JP2014/055939
§ 371 (c)(1),
(2) Date: Sep. 17, 2015

(87) PCT Pub. No.: WO2014/148278
PCT Pub. Date: Sep. 25, 2014

(65) Prior Publication Data
US 2016/0280191 A1 Sep. 29, 2016

(30) Foreign Application Priority Data

Mar. 22, 2013 (JP) ................................. 2013-060556

(51) Int. Cl.
*B60T 8/1755* (2006.01)
*B60T 1/10* (2006.01)
(Continued)

(52) U.S. Cl.
CPC .......... *B60T 8/17552* (2013.01); *B60L 3/102* (2013.01); *B60L 3/106* (2013.01); *B60L 7/22* (2013.01);
(Continued)

(58) Field of Classification Search
CPC ............. B60T 8/17551; B60T 8/17552; B60T 2270/603; B60T 227/604
See application file for complete search history.

(56) References Cited

U.S. PATENT DOCUMENTS 5,318,355 A   6/1994 Asanuma et al.
5,702,165 A   12/1997 Koibuchi
(Continued)

FOREIGN PATENT DOCUMENTS

EP    2 542 454       1/2013
JP    05-161209 A     6/1993
(Continued)

OTHER PUBLICATIONS

International Search Report (PCT/ISA/210) mailed on Jun. 10, 2014, by the Japanese Patent Office as the International Searching Authority for International Application No. PCT/JP2014/055939.
(Continued)

*Primary Examiner* — Dale W Hilgendorf
(74) *Attorney, Agent, or Firm* — Buchanan Ingersoll & Rooney PC

(57) ABSTRACT

The brake controller includes a friction brake device, a regeneration brake device, a required braking force calculating portion, a vehicle motion control portion which distributes the required braking force to the non-regeneration braking side right/left wheels that is either one of the right/left front wheels and right/left rear wheels, a maximum braking force calculating portion which calculates the maximum braking force at each wheel and a braking force control
(Continued)

portion-which calculates the regeneration braking force generated at the regeneration braking side right/left wheels within a range where the regeneration braking force to be generated at the regeneration braking side right/left wheels does not exceed a smaller value of the maximum braking forces of the regeneration braking side right/left wheels, based on the required braking force and the distribution of the braking force to the non-regeneration braking side right/left wheels.

5 Claims, 13 Drawing Sheets

(51) Int. Cl.
*B60T 8/17* (2006.01)
*B60L 3/10* (2006.01)
*B60L 7/22* (2006.01)
*B60L 11/14* (2006.01)
*B60L 15/20* (2006.01)
*B60W 10/00* (2006.01)
*B60T 8/40* (2006.01)

(52) U.S. Cl.
CPC ........... *B60L 11/14* (2013.01); *B60L 15/2009* (2013.01); *B60L 15/2045* (2013.01); *B60T 1/10* (2013.01); *B60T 8/17* (2013.01); *B60T 8/1755* (2013.01); *B60T 8/17551* (2013.01); *B60T 8/4077* (2013.01); *B60W 10/00* (2013.01); *B60L 2240/423* (2013.01); *B60L 2240/463* (2013.01); *B60L 2240/465* (2013.01); *B60T 2270/603* (2013.01); *B60T 2270/604* (2013.01); *Y02T 10/645* (2013.01); *Y02T 10/70* (2013.01); *Y02T 10/7077* (2013.01); *Y02T 10/72* (2013.01); *Y02T 10/7283* (2013.01)

(56) References Cited

U.S. PATENT DOCUMENTS

| | | | | |
|---|---|---|---|---|
| 5,895,100 | A * | 4/1999 | Ito | B60T 8/44 303/152 |
| 6,598,945 | B2 * | 7/2003 | Shimada | B60T 8/1755 303/152 |
| 6,957,870 | B2 * | 10/2005 | Kagawa | B60T 8/4081 303/155 |
| 7,104,617 | B2 * | 9/2006 | Brown | B60T 8/1755 303/152 |
| 7,974,761 | B2 | 7/2011 | Maeda et al. | |
| 8,303,049 | B2 * | 11/2012 | Busack | B60T 8/17616 303/151 |
| 8,977,465 | B2 * | 3/2015 | Kim | B60L 3/104 303/152 |
| 9,527,484 | B2 * | 12/2016 | Minarcin | B60T 7/042 |
| 2006/0220453 | A1 | 10/2006 | Saito et al. | |
| 2010/0174463 | A1 | 7/2010 | Uragami et al. | |
| 2011/0031804 | A1 | 2/2011 | Shimada et al. | |
| 2012/0152633 | A1 | 6/2012 | Tamura et al. | |

FOREIGN PATENT DOCUMENTS

| | | |
|---|---|---|
| JP | 08-310366 A | 11/1996 |
| JP | 2001-039281 A | 2/2001 |
| JP | 2006-256440 A | 9/2006 |
| JP | 2006-311791 A | 11/2006 |
| JP | 2008-137618 A | 6/2008 |
| JP | 2008-301564 A | 12/2008 |
| JP | 2009-255622 A | 11/2009 |
| JP | 2011-178286 A | 9/2011 |
| WO | 2006/129820 A1 | 12/2006 |

OTHER PUBLICATIONS

Extended Search report issued Dec. 5, 2016, by the European Patent Office in corresponding European Application No. 14769285.9-1756. (8 pages).

* cited by examiner

FLOWCHART 1

FLOWCHART 2

BRAKE CONTROLLER

TECHNICAL FIELD

This invention relates to a brake controller which controls a vehicle braking operation by applying both friction braking force and regeneration braking force.

BACKGROUND ART

Conventionally, in an EV (electric vehicle) and an HEV (hybrid electric vehicle), both regeneration braking force and friction braking force are used as a braking force for the vehicle. In such vehicles, particularly, when a braking operation is performed during the vehicle being running straight, the regeneration braking force is used as much as possible by converting the kinetic energy of the vehicle into the electric energy, thereby to effectively recover the energy so that the fuel efficiency of the vehicle can be improved. However, when the vehicle makes a turn, the gripping force of the wheels including the steered wheels of the vehicle drops. Therefore, if the same amount of the regeneration braking force is generated at the vehicle turning operation as the amount of regeneration braking force at the straight running of the vehicle, the steered wheels may slip due to the drop of the gripping force. If a sideslipping is generated at the vehicle, a motion control device starts generating a friction braking force differential between the steered wheels of the vehicle according to the sidesliding state of the vehicle. Under such situation, if a large regeneration braking force is kept being generated at the steered wheels, it would be difficult to effectively generate the friction braking force differential between the steered wheels. Therefore, according to a conventional technology disclosed in a Patent Literature 1, a brake device is installed which decreases the ratio of the regeneration braking force in response to the decreased gripping force of the tires, when the gripping force is decreased during the vehicle turning operation or the like. Thus, the gripping force of the tires can be assured. Further, since the ratio of the regeneration braking force is decreased and the portion of the braking force corresponding to the decreased regeneration braking force can be replaced with the friction braking force, it becomes possible to perform the vehicle motion control.

CITATION LIST

Patent Literature

Patent Literature 1: JP2001-39281 A

SUMMARY OF INVENTION

Technical Problem(s)

In the above described brake device, it is described that the gripping force is secured by decreasing the ratio of the regeneration braking force according to the gripping force of tires. However, there is no description about to what degree the regeneration braking force should be controlled in order to effectively improve the fuel efficiency.

Accordingly, this invention was made in consideration with the above-mentioned situation and the objective of the invention is to provide a brake controller which can effectively improve the fuel efficiency by generating the regeneration braking force to a vehicle as much as possible even during a vehicle turning motion or the like in which a gripping force of tire is decreased.

Solution to Problem(s)

The brake controller according to a first aspect of the invention includes a friction brake device provided at each wheel of a vehicle for generating a friction braking force at each wheel of the vehicle, a regeneration brake device for generating a regeneration braking force which is generated by a generator equipped in the vehicle, at regeneration braking side right/left wheels which are one side of right/left front wheels and right/left rear wheels with the same amount at each of the regeneration braking side right/left wheels, a required braking force calculating portion for calculating a required braking force corresponding to a deceleration required to the vehicle, a vehicle motion control portion which distributes the required braking force to the regeneration braking side right/left wheels and to non-regeneration braking side right/left wheels which are the other of right/left front wheels and right/left rear wheels, a maximum braking force calculating portion for calculating a maximum braking force which corresponds to a maximum allowable braking force applicable to the each wheel without causing a slipping at the each wheel, and a braking force control portion which calculates the regeneration braking force to be generated at the regeneration braking side right/left wheels within a range where the regeneration braking force to be generated at the regeneration braking side right wheel and the regeneration braking force to be generated at the regeneration braking side left wheel do not exceed a smaller maximum braking force between the maximum braking forces applicable at the regeneration braking side right/left wheels, based on the required braking force and a distribution of a braking force to the non-regeneration braking side right/left wheels.

By this structure, within a range that the regeneration braking side right/left wheels grip, the kinetic energy of the vehicle is recovered as the electric energy thereby to effectively improve fuel efficiency. Further, even when the regeneration braking force set by the braking force control portion is generated, such regeneration braking force would not exceed the maximum braking force at each regeneration braking side right/left wheels. This can suitably secure the gripping force at the regeneration braking side right/left wheels.

According to the brake controller of a second aspect of the invention associated with the first aspect above, the braking force control portion sets the regeneration braking force to be generated at the regeneration braking side right/left wheels to a value equal to or less than a value obtained by subtracting a minimum friction braking force calculated by the vehicle motion control portion to be generated by the friction brake device at the non-regeneration braking side right/left wheels from the required braking force.

By this structure, the vehicle can keep a stable braking state by the minimum friction braking force secured at the non-regeneration braking side right/left wheels, recovering the regeneration energy effectively by the regeneration braking side right/left wheels.

According to the brake controller of a third aspect of the invention associated with the first aspect above, the friction brake device generates the friction braking force which corresponds to an equally generated hydraulic pressure which is generated equally at the each of the non-regeneration braking side right/left wheels and the each of the regeneration braking side right/left wheels and the braking force control portion sets the regeneration braking force to be generated at the regeneration braking side right/left wheels to be a value equal to or less than a value obtained by subtracting the sum of each friction braking force from the required braking force.

By this structure, when a braking force is required, the equal amount of the hydraulic pressure is supplied to the wheel cylinders of the all of the vehicle wheels and the friction braking force corresponding to the equally supplied hydraulic pressure is generated at each wheel, and the regeneration braking force and the friction braking force within a range not exceeding the maximum braking force at the each wheel are generated at the regeneration braking side right/left wheels. Accordingly, the regeneration braking side right/left wheels can recover the regeneration energy, keeping the necessary gripping force.

According to the brake controller of a fourth aspect of the invention associated with the second aspect above, the braking force control portion controls the friction brake device so that the friction braking force is generated based on a right/left distribution ratio when the right/left distribution ratio of the braking force distributed to the non-regeneration braking side right/left wheels is set to stabilize the posture of the vehicle.

By this structure, the regeneration energy can be recovered, keeping the vehicle to be in a stable running state.

According to the brake controller of a fifth aspect of the invention associated with the fourth aspect above, the braking force control portion controls the friction braking force so that when the friction braking force to be generated at one of the non-regeneration braking side right/left wheels exceeds the maximum braking force of the one of the non-regeneration braking side right/left wheels, the excess friction braking force exceeding the maximum braking force is subtracted from the braking force to be generated at the one of the non-regeneration braking side right/left wheels and is added to the friction braking force at the other of the non-regeneration braking side right/left wheels and when the friction braking force to be generated at the other of the non-regeneration braking side right/left wheels falls below the minimum friction braking force of the other of the non-regeneration braking side right/left wheels, the deficient friction braking force short of the minimum friction braking force is added to the braking force to be generated at the other of the non-regeneration braking side right/left wheels and is subtracted from the friction braking force at the one of the non-regeneration braking side right/left wheels.

By this structure, since the friction braking force of any one of the non-regeneration braking side right/left wheels is set not to exceed the maximum braking force and not to fall below the minimum friction braking force, the gripping force is surely secured and at the same time a desired braking force can be obtained. Further, since the sum of the friction braking force at the non-regeneration braking side right/left wheels is always kept constant, a constant deceleration can be obtained not to give an operator of the vehicle any uncomfortable feeling in deceleration operation.

BRIEF EXPLANATION OF ATTACHED DRAWINGS

EMBODIMENTS FOR IMPLEMENTING INVENTION (Explanation of Structure of Hybrid Vehicle)

Figure 1:
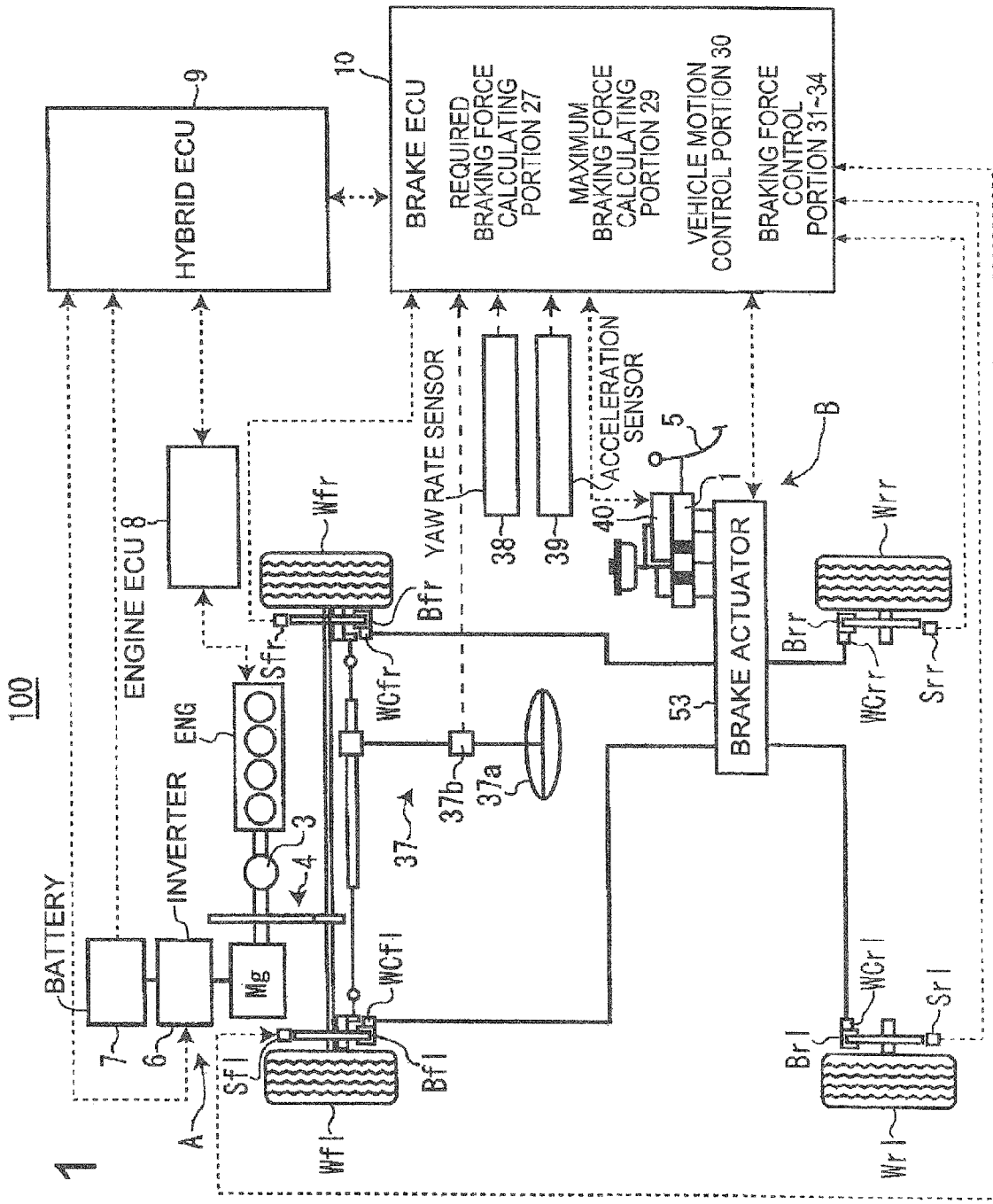
FIG. 1 is a general view of the brake controller according to the invention adapted to a hybrid vehicle as an embodiment of the invention.

The brake controller of the present invention according to a first embodiment applied to the hybrid vehicle will be explained hereinafter with reference to the attached drawings. As shown in FIG. 1, the hybrid vehicle 100 (hereinafter referred to simply as "vehicle 100") is a vehicle whose driven wheels, for example, right/left front wheels Wfr and Wfl are driven by a hybrid system. The vehicle 100 is equipped with an engine ENG, a motor/generator Mg (corresponding to the generator of the invention), an inverter 6, a battery 7, a regeneration brake device A, a friction brake device B, an engine ECU 8, a hybrid ECU 9 and a brake ECU 10, etc.

The driving force from the engine ENG is transmitted to the driven wheels that are right/left front wheels Wfr and Wfl via a power split mechanism 3 and a power transmitting mechanism 4. The driving force from the motor/generator Mg is transmitted to the right/left front wheels Wfr and Wfl via the power transmitting mechanism 4.

The inverter 6 is used for voltage conversion between the motor/generator Mg and the battery 7 serving as a DC power source. The engine ECU 8 adjusts the rotation speed of the engine ENG based on the instructions from the hybrid ECU 9. The hybrid ECU 9 controls the motor/generator Mg through the inverter 6. The hybrid ECU 9 is connected to the battery 7 and monitors the charging state and the charging current, etc. of the battery 7.

In the structure explained above, the brake controller is formed by the regeneration brake device A, the friction brake device B, the hybrid ECU 9 which controls the regeneration brake device A and the brake ECU 10 which controls the friction brake device B, etc. The regeneration brake device A generates "regeneration braking force Fc" at driven wheels, which are the right/left front wheels Wfr and Wfl corresponding to the regeneration braking side right/left wheels according to the invention. The friction brake device B generates "friction braking force Fm" at the right/left front wheels Wfr and Wfl and the right/left rear wheels Wrr and Wrl corresponding to the non-regeneration braking side right/left wheels according to the invention.

According to the embodiment, the engine ECU 8, the hybrid ECU 9 and the brake ECU 10 are connected with one another for mutual communication by a bus of CAN (Controller Area Network).

Further, the vehicle 100 is equipped with a steering device 37 which is formed by a steering wheel 37*a* and a steering sensor 37*b*. The steering wheel 37*a* is connected to steered wheels (right/left front wheels) of the vehicle and the direction of the steered wheels can be freely changeable by the operation of the steering wheel 37*a* by a driver of the vehicle. The steering sensor 37*b* detects the operation amount (rotation angle) of the steering wheel 37*a*. The total gear ratio of the steering gear mechanism of the steering device 37 is set in advance to a predetermined value and is indicated by the ratio of the rotation angle (steering wheel angle) of the steering wheel 37*a* relative to the steered angle of the steered wheels. In other words, the steering sensor 37*b* is a steered angle sensor which detects a steered angle of the steered wheels.

Further, the vehicle 100 is equipped with a yaw rate sensor 38 for detecting a turning behavior of the vehicle 100 and an acceleration sensor 39. The yaw rate sensor 38 is assembled to the vehicle at a position in the vicinity of the center of gravity of the vehicle body and detects an actual yaw rate (actual yaw rate Ya) generated at the vehicle 100. The acceleration sensor 39 is also assembled to the vehicle at a position in the vicinity of the center of gravity of the vehicle body and detects an actual lateral acceleration and front/rear acceleration generated at the vehicle 100.

(Regeneration Brake Device A)

The regeneration brake device A includes the motor/generator Mg, the inverter 6 and the battery 7 as explained above. The motor/generator Mg functions as a motor for generating a rotation drive force when the electricity is supplied and functions as a generator for generating the electricity and at the same time generating a regeneration braking force.

The motor/generator Mg is, for example, an AC synchronizing type motor and is rotatably connected to both right/left front wheels Wfr and Wfl. The inverter 6 charges the battery 7 by converting the AC electric power generated by the motor/generator Mg into the DC electric power and converts the DC current charged in the battery 7 into the AC current to supply the motor/generator Mg with the converted AC current. The regeneration brake device A generates the regeneration braking force Fc based on the speed of the vehicle 100 at the right/left front wheels Wfr and Wfl (regeneration braking side right/left wheels) which are the driven wheels when the motor/generator Mg functions as the generator.

(Friction Brake Device B)

The friction brake device B applies the friction braking force Fm directly to respective wheels Wfr, Wfl, Wrr and Wrl to apply brakes to the vehicle 100. The friction brake device B includes a master cylinder 1, a reaction force generating device 20, a control valve 22 and a control valve 25. Further, the friction brake device B includes a servo pressure generating device 40, a brake actuator 53, respective wheel cylinders WCfr, WCfl, WCrr and WCrl which are operated by a hydraulic pressure generated by the brake actuator 53 and various sensors Sfr, Sfl, Srr and Srl 72-75 which are communicable with the brake ECU 10. Respective wheel cylinders WCfr, WCfl, WCrr and WCrl is provided at respective corresponding friction brakes Bfr, Bfl, Brr and Brl provided at respective wheel Wfr, Wfl, Wrr and Wrl (See FIG. 1).

(Master Cylinder 1)

Figure 2:
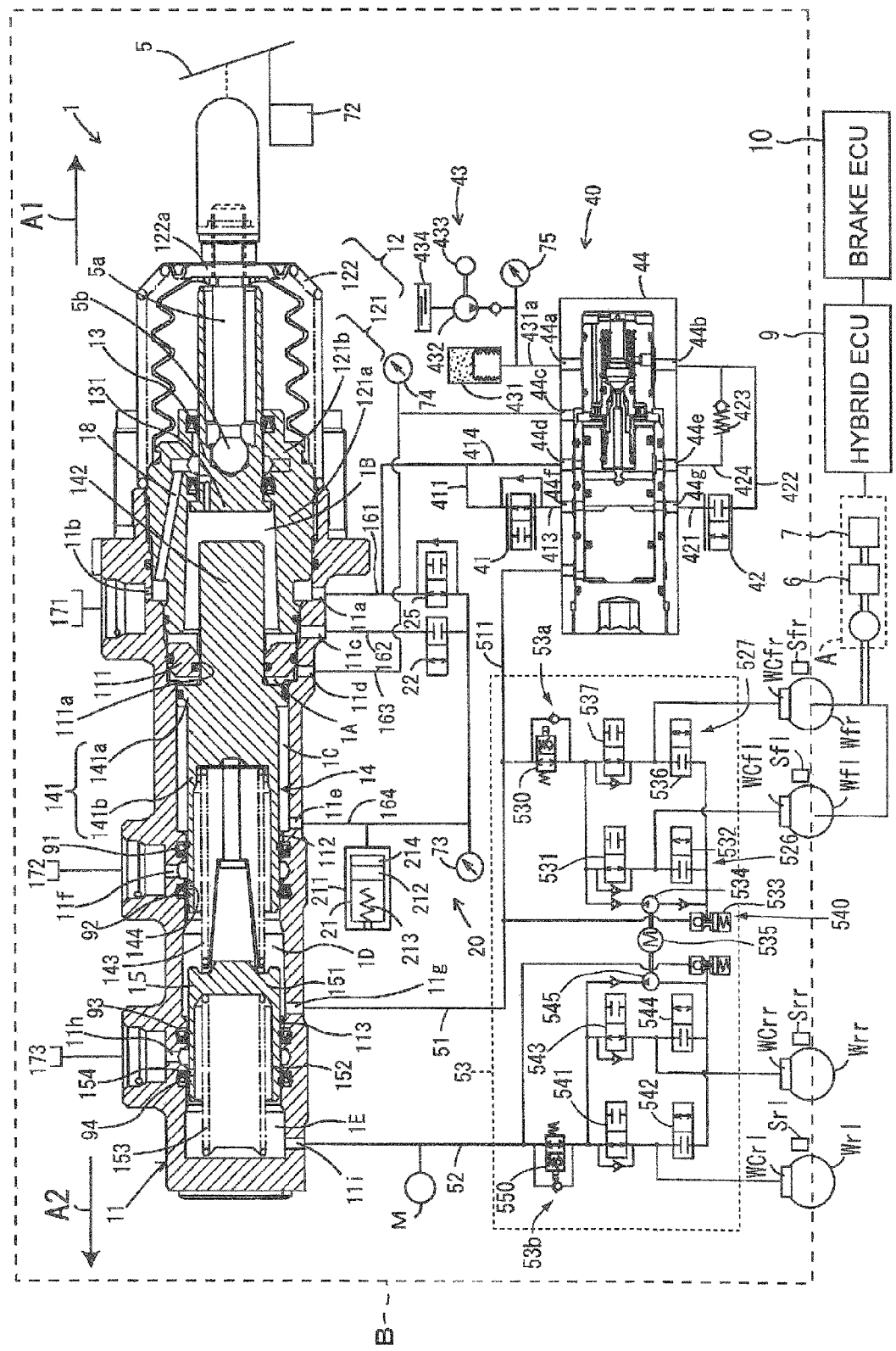
FIG. 2 is a general view of a friction brake device for the hybrid vehicle shown in FIG. 1.

As shown in FIG. 2, the master cylinder 1 supplies the wheel cylinders WCfr, WCfl, WCrr and WCrl with the brake fluid via the brake actuator 53. The master cylinder 1 is formed mainly by a main cylinder 11, a cover cylinder 12, an input piston 13, a first master piston 14 and a second master piston 15.

The main cylinder 11 is formed approximately in a bottomed cylinder shape open at one end and having a bottom surface closed at the other end thereof. The master cylinder 1 will be explained hereinafter such that the opening side of the main cylinder 11 is assumed to be the rearward (arrow A1 direction) and the bottom surface side of the main cylinder 11 is assumed to be the frontward (arrow A2 direction). The main cylinder 11 includes therein an inner wall portion 111, which divides the inner portion of the main cylinder 11 into the opening side (arrow A1 direction side) and the bottom surface side (arrow A2 direction side). The inner wall portion 111 is provided with a through hole 111*a* at a central portion thereof axially (in front/rear direction) penetrating through the inner wall portion 111.

The main cylinder 11 is provided therein at portions closer to the front end than the inner wall portion 111 with small diameter portions 112 (rearward) and 113 (frontward). The small diameter portions 112 and 113 are formed by reducing the diameters of portions of the inner peripheral surface of the main cylinder 11. The first and the second master pistons 14 and 15 are axially slidably disposed inside of the main cylinder 11. Ports connecting the inside and outside of the cylinder will be explained later.

The cover cylinder 12 includes an approximately cylindrical portion 121 and a cup-shaped compression spring 122. The cylindrical portion 121 is arranged at a rear end of the main cylinder 11 and is coaxially fitted into the rear side opening of the main cylinder 11. An inner diameter of a front portion 121*a* of the cylindrical portion 121 is formed to be larger than an inner diameter of an inner diameter of the rear portion 121*b*, Further, the inner diameter of the front portion 121*a* is formed to be larger than an inner diameter of the through hole 111*a* of the inner wall portion 111.

The compression spring 122 is assembled to the rear end portion of the main cylinder 11 and the outer peripheral surface of the cylindrical portion 121 such that the opening of the main cylinder 11 and the rear end side opening of the cylindrical portion 121 are covered thereby. The rear end of the compression spring 122 is abutted to a flange member secured to an operating rod 5*a*. The compression spring 122 is formed by an elastic member which is extendable in an axial direction and the rear end thereof is biased in a rearward direction.

The input piston 13 is a piston configured to slidably move inside the cover cylinder 12 in response to an operation of the brake pedal 10. The input piston 13 is formed approximately in a bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged so that the bottom wall 131 is located at a rear portion of the front portion 121*a* of the cylindrical portion 121. The input piston 13 is arranged slidably in an axial direction and fluid-tightly in an inner peripheral surface of the rear portion 121*b* of the cylindrical portion 121.

The operating rod 5a of a brake pedal 5 and a pivot 5b are arranged inside of the input piston 13. The operating rod 5a extends outwardly through the opening of the input piston 13 and a flange member 122a and is connected to the brake pedal 5. The operating rod 5a moves in association with the operation of the brake pedal 5 and advances forward when the brake pedal 5 is depressed, compressing the compression spring 122 in an axial direction. In accordance with the advancing movement of the operating rod 5a, the input piston 13 also advances.

The first master piston 14 is arranged in the main cylinder 11 and is slidably movable in the axial direction. The first master piston 14 includes a first main body portion 141 and a projection portion 142. The first main body portion 141 is arranged in the main cylinder 11 at a front side of the inner wall portion 111 in coaxial relation with the main cylinder 11. The first main body portion 141 is formed approximately in a bottomed cylinder shape having an opening at a front portion thereof and a flange portion 141a at a rear portion thereof. In other words, the first main body portion 141 includes the flange portion 141a and a peripheral wall portion 141b.

The flange portion 141a is arranged slidably in an axial direction and fluid-tightly at the front side of the inner wall portion 111 in the main cylinder 11. The peripheral wall portion 141b is formed to be of cylindrical shape having a diameter smaller than that of the flange portion 141a. The peripheral wall portion 141b extends frontward from the front end surface of the flange portion 141a to be coaxial with the main cylinder 11. The frontward portion of the peripheral wall portion 141b is arranged slidably in an axial direction and fluid-tightly in the small diameter portion 112. The rearward portion of the peripheral wall portion 141b is separated from the inner peripheral surface of the main cylinder 11.

The projection portion 142 is a portion formed in a columnar shape, which extends in a rearward direction from the center of the end surface of the flange portion 141a of the first main body portion 141. The projection portion 142 is arranged slidably in an axial direction and fluid-tightly in the through-hole 111a of the inner wall portion 111. The rearward portion of the projection portion 142 is positioned inside of the cylindrical portion 121 through the through-hole 111a and is separated from the inner peripheral surface of the cylindrical portion 121. The rear end surface of the projection portion 142 is separated from the bottom wall 131 of the input piston 13 by a predetermined distance. The first master piston 14 is biased by a biasing member 143 formed by a coil or the like towards the rearward direction.

A "servo chamber 1A" is defined by the rear end surface of the flange portion 141a of the first main body 141, the front end surface of the inner wall portion 111, the inner peripheral surface of the main cylinder 11 and the outer peripheral surface of the projection portion 142. A "hydraulic pressure chamber 1B" is defined by the rear surface of the inner wall portion 111, the outer surface of the bottom wall 131 of the input piston 13, the inner peripheral surface of the front portion 121a of the cylindrical portion 121 and the outer surface of the projection portion 142. A "hydraulic pressure chamber 1C" is defined by the rear end surface of the small diameter portion 112 (including the seal member 91), the outer peripheral surface of the first master piston 14 and the inner peripheral surface of the main cylinder 11.

The second master piston 15 is coaxially arranged within the main cylinder 11 at a location forward of the first master piston 14. The second master piston 15 is formed in approximately a cylindrical shape having an opening at a front portion thereof and a bottom wall 151 at a rear portion. In other words, the second master piston 15 includes the bottom wall 151 and a peripheral wall portion 152 whose diameter is equal to the diameter of the bottom wall 151. The bottom wall 151 is arranged between the small diameter portions 112 and 113 at the frontward side of the first master piston 14. The rear portion of the second master piston 15 including the bottom wall 151 is separated from the inner peripheral surface of the main cylinder 11. The cylindrical peripheral wall portion 152 extends frontward from the bottom wall 151. The peripheral wall portion 152 is arranged slidably in an axial direction and fluid-tightly in the small diameter portion 113. The second master piston 15 is biased reward by a biasing member 153 formed by a coil or the like.

A "first master chamber 1D" is defined by a space between the first master piston 14 and the second master piston 15 in the main cylinder 11. A space defined by the second master piston 15 in the main cylinder 11 is a "second master chamber 1E"

Ports 11a to 11i, which connect the inside and the outside of the master cylinder 1, are formed at the master cylinder 1. The port 11a is formed at a location rearward of the inner wall portion 111 at the main cylinder 11. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a is connected to a conduit 161 and the port 11b is connected to a reservoir 171. Therefore, the port 11a is in fluid communication with the reservoir 171.

The port 11b is in communication with the hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the hydraulic pressure chamber 1B and the reservoir 171 is interrupted.

The port 11c is formed at a location rearward of the inner wall portion 111 and forward of the port 11a and the port 11c connects the hydraulic pressure chamber 1B with a conduit 162. The port 11d is formed at a location forward of the port 11c and connects the servo chamber 1A with a conduit 163. The port 11e is formed at a location forward of the port 11d and connects the hydraulic pressure chamber 1C with a conduit 164. The hydraulic pressure sensor 74 is a sensor which detects a pressure (servo pressure) in the servo chamber 1A and is connected to the conduit 163.

The port 11f is formed between the sealing members 91 and 92 provided at the small diameter portion 112 and connects a reservoir 172 with the inside of the main cylinder 11. The port 11f is in communication with the first master chamber 1D via a passage 144 formed at the first master piston 14. The passage 144 is formed at a location somewhat rearward of the seal member 92, so that the port 11f and the first master chamber 1D are disconnected from each other when the first master piston 14 advances forward.

The port 11g is formed at a location forward of the port 11f and connects the first master chamber 1D with a conduit 51. The port 11h is formed between the sealing members 93 and 94 provided at the small diameter portion 113 and connects a reservoir 173 with the inside of the main cylinder 11. The port 11h is in communication with the second master chamber 1E via a passage 154 formed at the second master piston 15. The passage 154 is formed at a location somewhat rearward of the seal member 94, so that the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like is appropriately provided within the master cylinder 1. The sealing members 91 and 92 are provided at the small diameter portion 112 and are in liquid-tightly contact with the outer circumferential surface of the first master piston 14. Similarly, the sealing members 93 and 94 are provided at the small diameter portion 113 and are in liquid-tightly contact with the outer circumferential surface of the second master piston 15. Additionally, sealing members are provided between the input piston 13 and the cylindrical portion 121. A stroke sensor 72 is provided at the brake pedal 5. The stroke sensor 72 is a sensor which detects the stroke amount (operating amount by the operator of the vehicle) of the brake pedal 5. The detection result is sent to the brake ECU 10.

(Reaction Force Generating Device 20)

The reaction force generating device 20 includes a stroke simulator 21. The stroke simulator 21 generates a reaction force pressure in the hydraulic pressure chamber 10 through the hydraulic pressure chamber 1B in response to the stroke amount of the brake pedal 5. The stroke simulator 21 is configured in such a manner that a piston 212 is fitted into a cylinder 211 while being allowed to slidably move therein. The piston 212 is biased in the frontward direction by a compression spring 213 and a simulator hydraulic pressure chamber 214 is formed at a location frontward of the piston 212. The stroke simulator 21 is connected to the hydraulic pressure chamber 10 via a conduit 164 and the port 11e, and is connected further to the control valves 22 and 25 via the conduit 164.

(Control Valve 22)

The control valve 22 is a normally closed type electromagnetic valve whose opening and closing operations are controlled by the brake ECU 10. The control valve 22 is connected to the conduits 162 and 164 to have the conduits to be in connected state or in disconnected state. In other words, the control valve 22 is an opening/closing valve which connects or disconnects the hydraulic pressure chambers 1B and 1C.

(Control Valve 25)

The control valve 25 is normally open type electromagnetic valve whose opening and closing operations are controlled by the brake ECU 10. The control valve 25 is connected to the conduits 161 and 164 to have the conduits to be in connected state or in disconnected state. When the control valve 22 is in an open state, the control valve 25 establishes or interrupts the connection between the hydraulic pressure chambers 1B and 1C and the reservoir 171. When the control valve 22 is in a closed state, the control valve 25 connects or disconnects the hydraulic pressure chamber 1C and the reservoir 171.

(Control of Control Valves 22 and 25)

The control of the control valves 25 and 22 by the brake ECU 10 under a brake operation will be explained hereinafter. When the brake pedal 5 is depressed, the input piston 13 advances to disconnect the passage 18, thereby interrupting the communication between the reservoir 171 and the hydraulic pressure chamber 1B. At the same time, the brake ECU 10 controls the control valve 25 to change the state from the opening state to the closed state and controls the control valve 22 to change the state from the closed state to the opening state. By the closure of the control valve 25, the communication between the hydraulic pressure chamber 1C and the reservoir 171 is interrupted. By the opening of the control valve 22, the communication between the hydraulic pressure chambers 1B and 1C is established. In other words, when the input piston 13 advances and the control valve 25 is closed, the hydraulic pressure chambers 1B and 1C are disconnected from the reservoir 171. Then, the stroke simulator 21 generates the reaction force pressure Pr in the hydraulic pressure chambers 1B and 1C corresponding to the stroke amount St of the brake pedal depressed by the operator of the vehicle. It is noted that in this situation, the brake fluid, the amount of which is the same with the fluid amount of the brake fluid discharged from or flowing into the hydraulic pressure chamber 1B in response to the movement of the first and the second master pistons 14 and 15, is flowing into or discharged from the hydraulic pressure chamber 1C.

(Servo Pressure Generating Device 40)

The servo pressure generating device 40 is formed by a pressure decreasing valve 41, a pressure increasing valve 42, a pressure supplying portion 43 and a regulator 44 and so on. The pressure decreasing valve 41 is a normally open type electromagnetic valve (linear electromagnetic valve) and the flow rate thereof is controlled by the brake ECU 10. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and the ports 11a and 11b. The pressure increasing valve 42 is a normally closed type electromagnetic valve (linear electromagnetic valve) and the flow-rate thereof is controlled by the brake ECU 10. One end of the pressure increasing valve 42 is connected to the conduit 421 and the other end thereof is connected to the conduit 422.

The pressure supplying portion 43 is a portion for supplying the regulator 44 with a highly pressurized brake fluid in response to the instructions from the brake ECU 10. The pressure supplying portion 43 includes mainly an accumulator 431, a hydraulic pressure pump 432, a motor 433 and a reservoir 434.

The accumulator 431 accumulates a hydraulic pressure generated by the operation of the pump 432. The accumulator 431 is connected to the regulator 44, hydraulic pressure sensor 75 and the pump 432 via a conduit 431a. The pump 432 is connected to the motor 433 and the reservoir 434. The pump 432 is driven by the motor 433 and supplies the accumulator 431 with the brake fluid reserved in the reservoir 434. The pressure sensor 75 is a sensor which detects the hydraulic pressure of the brake fluid accumulated in the accumulator 431 and the hydraulic pressure detected by the hydraulic pressure sensor 75 is referred to as the accumulator pressure.

When the pressure sensor 75 detects that the accumulator hydraulic pressure Pac drops to a value equal to or lower than a predetermined value, the motor 433 is driven on the basis of a control signal from the brake ECU 10 and the pump 432 supplies the accumulator 431 with the brake fluid to supplement the pressure energy.

Figure 3:
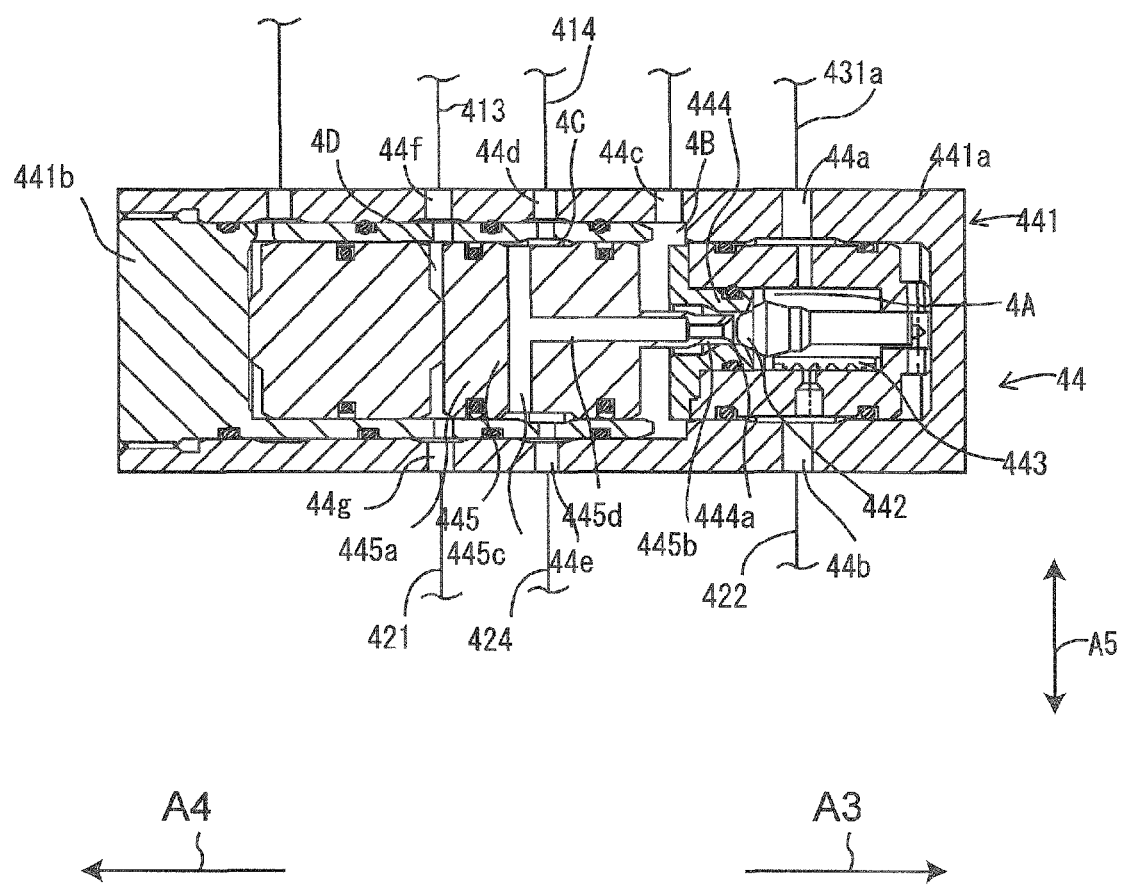
FIG. 3 is a cross section view of a regulator of the friction brake device shown in FIG. 1.

FIG. 3 is a partial cross sectional view illustrating a configuration of the regulator 44 of FIG. 2. As shown in the drawing, the regulator 44 includes mainly a cylinder 441, a ball valve 442, a biasing portion 443, a valve seat portion 444 and a control piston 445 and so forth.

The cylinder 441 includes a cylinder case 441a formed approximately in a bottomed cylinder-shape having a bottom surface at one end thereof (arrow A3 direction side) and a cover member 441b closing an opening side of the cylinder case 441a (arrow A4 directionside). The cylinder case 441a is provided with a plurality of ports 44a through 44g, through which the inside and the outside of the cylinder case 441a are in communication.

The port 44a is connected to the conduit 431a. The port 44b is connected to the conduit 422 which is in communication with the conduit 424 via the relief valve 423. The port 44c is connected to a conduit 163. The port 44d is connected to the conduit 161 via the conduit 414. The port 44e is connected to the conduit 424. The port 44f is connected to the conduit 413. The port 44g is connected to the conduit 421.

The ball valve 442 is a valve whose seal portion is formed in a ball shape and is arranged at the bottom surface side (arrow A3 direction side, which will be hereinafter referred to as a cylinder bottom surface side) of the cylinder case 441a inside of the cylinder 441. The biasing portion 443 is formed by a spring member biasing the ball valve 442 towards the opening side (arrow A4 direction side, which will be hereinafter referred to as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side (arrow A4 direction side) and the cylinder bottom surface side (arrow A3 direction side). A through passage 444a through which the divided cylinder opening side (arrow A4 direction) and the cylinder bottom surface side (arrow A3 direction) are in communication is formed at a center of the valve seat portion 444. The valve seat portion 444 supports the ball valve 442 from the cylinder opening side (arrow A4 direction side) in a manner that the biased ball valve 442 closes the through passage 444a.

A space defined by the ball valve 442, the biasing portion 443, the valve seat portion 444 and the inner circumferential surface of the cylinder case 441a at the cylinder bottom surface side (arrow A3 direction side) is referred to as a "first chamber 4A". The first chamber 4A is filled with the brake fluid and is connected to the conduit 431a via the port 44a and to the conduit 422 via the port 44b.

The control piston 445 includes a main body portion 445a formed approximately in a columnar shape and a projection portion 445b formed approximately in a columnar shape having a smaller diameter than the main body portion 445a. The main body portion 445a is arranged in the cylinder 441 in a coaxial and liquid-tight manner on the cylinder opening side (arrow A4 direction side) of the valve seat portion 444 and is slidably movable in the axial direction. The main body portion 445a is biased towards the cylinder opening side (arrow A4 direction side) by means of a biasing member (not shown). A passage 445c is formed in the main body portion 445a at an approximately intermediate portion in a cylinder axis direction and extends in a radial direction (in the arrow A5 direction) for both ends thereof to open to the peripheral surface of the main body 445a. A portion of an inner circumferential surface of the cylinder 441 corresponding to an opening position of the passage 445c is provided with the port 44d and a recessed space portion. A "third chamber 4C" is defined between the recessed space portion and the main body portion 445a.

The projection portion 445b projects towards the cylinder bottom surface side (in the arrow A3 direction) from a center portion of an end surface of the cylinder bottom surface side (arrow A3 direction side) of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side (in the arrow A4 direction) by a predetermined distance. A passage 445d is formed at the projection portion 445b so that the passage 445d extends in the cylinder axis direction and opens at a center portion of an end surface of the cylinder bottom surface side (arrow A3 direction side) of the projection portion 445b. The passage 445d extends up to the inside of the main body portion 445a and is connected to the passage 445c.

A space defined by the end surface of the cylinder bottom surface side (arrow A3 direction side) of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 44d and 44e via the passages 445c and 445d and the third chamber 4C.

A "pilot chamber 4D" is defined by the end surface of the cylinder opening side (arrow A4 direction side) of the control piston 445 and the inner peripheral surface of the cylinder 441. The "pilot chamber 4D" is in communication with the pressure decreasing valve 41 via the port 44f and the conduit 413 and is in communication with the pressure increasing valve 42 via the port 44g and the conduit 421.

A sealing member, such as an O-ring and the like is appropriately provided within the regulator 44. Particularly, sealing members are provided at the control piston 445 and are in liquid-tightly contact with the inner circumferential surface of the cylinder case 441a.

(Brake Actuator 53 and Wheel Cylinders WCfr, WCfl, WCrr and WCrl)

As shown in FIG. 2, the first and the second master chambers 1D and 1E of the master cylinder 1, which generates the master pressure, are connected to the wheel cylinders WCfr, WCfl, WCrr and WCrl via the ports 11g and 11i, the conduits 51 and 52 and the brake actuator 53. The brake actuator 53 is a brake actuator used for a known ABS (Anti-lock Brake System). The brake actuator 53 is connected to the wheel cylinders WCfr, WCfl, WCrr and WCrl which operate to perform braking operation at the respective vehicle wheels Wfr, Wfl, Wrr and Wrl.

The brake actuator 53 is formed by a plurality of systems which are hydraulic pressure circuits independently operable. In more specifically, the brake actuator 53 includes a first system 53a and a second system 53b. The first system 53a engages with the braking force control for the right front wheel Wfr and the left front wheel Wfl by establishing fluid communication between the first master chamber 1D of the master cylinder 1 and the wheel cylinders WCfr and WCfl of the right front wheel Wfr and the left front wheel Wfl, respectively.

The second system 53b engages with the braking force control for the right rear wheel Wrr and the left rear wheel Wrl by establishing fluid communication between the second master chamber 1E of the master cylinder 1 and the wheel cylinders WCrr and WCrl of the right rear wheel Wrr and the left rear wheel Wrl, respectively. Hereinafter, the explanation will be made mainly based on the structure of the first system 53a. The structure of the second system 53b is similar to the structure of the first system 53a and accordingly, the explanation thereof will be omitted unless necessity arises.

The first system 53a includes a pressure differential control valve 530, a left front wheel hydraulic pressure control portion 526, a right front wheel hydraulic pressure control portion 527 and a first pressure decreasing portion 540.

The pressure differential control valve 530 is a normally open type linear electromagnetic valve (normal open linear solenoid valve) which is disposed between the upper stream portion of the left front wheel hydraulic pressure control portion 526 and the upper stream portion of the right front wheel hydraulic pressure control portion 527. The pressure differential control valve 530 is controlled by the brake ECU 10 to be switched over between the communicating state (non-pressure differential state) and the pressure differential state. The pressure differential control valve 530 is normally in communicating state when no electric current is supplied, but when the electric current is supplied, the state is changed over to the pressure differential state (changed to the closing side). Then the hydraulic pressures at the respective wheel cylinder WCfl and WCfr sides are kept higher than the hydraulic pressures at the master cylinder 1 side by the value of the controlled pressure differential. This controlled pressure differential is adjusted in response to the control current by the brake ECU 10. Thus, the controlled hydraulic pressure corresponding to the controlled pressure differential is generated based on the premise of pressure application by the pump 534.

The left front wheel hydraulic pressure control portion 526 can control the hydraulic pressure to be supplied to the wheel cylinder WCfl and is formed by a pressure increasing valve 531 which is a two-port, two-position change over type normal open electromagnetic on-off valve and a pressure decreasing valve 532 which is a two-port, two-position change over type normal closed electromagnetic on-off valve. The pressure increasing valve 531 is disposed between the pressure differential control valve 530 and the wheel cylinder WCfl and establishes or interrupts the fluid communication between the pressure differential control valve 530 and the wheel cylinder WCfl in response to the instructions from the brake ECU 10. The pressure decreasing valve 532 is disposed between the wheel cylinder WCfl and a pressure adjusting reservoir 533 and establishes or interrupts the fluid communication between the wheel cylinder WCfl and the pressure adjusting reservoir 533 in response to the instructions from the brake ECU 10. According to the structure above, the hydraulic pressure in the wheel cylinder WCfl can be increased, held and decreased.

The first pressure decreasing portion 540 is formed by the pump 534, a motor 535 for pump drive and the pressure adjusting reservoir 533. The pump 534 pumps up the brake fluid in the pressure adjusting reservoir 533 and the pumped up brake fluid is supplied into a fluid passage between the pressure differential control valve 530 and the pressure increasing valves 531 and 537. The pump 534 is driven by the motor 535 for pump drive in response to the instructions from the brake ECU 10.

The pressure adjusting reservoir 533 serves as a reservoir for temporarily reserving the brake fluid returned from the wheel cylinders WCfl and WCfr via the pressure decreasing valves 532 and 536. The pressure adjusting reservoir 533 is connected to the master cylinder 1.

Regarding the second system 53b, the structure thereof is similar to the first system 53a explained above and by the control thereof similar to the first system 53a, the hydraulic pressures in the wheel cylinders WCrr and WCrl are controlled to be increased, held and decreased. It is noted that the hydraulic pressures in each of the wheel cylinders WCfr, WCfl, WCrr and WCrl are monitored by a single pressure sensor M. The pressure sensor outputs signal corresponding to the hydraulic pressure to the brake ECU 10.

As shown in FIG. 1 and FIG. 2, vehicle wheel speed sensors Sfr, Sfl, Srr and Srl are provided in the vicinity of respective wheel axles of vehicle wheels Wfr, Wfl, Wrr and Wrl and are communicable with the brake ECU 10. The vehicle wheel sensors output pulse signals with frequency corresponding to the rotation speed of the wheels Wfr, Wfl, Wrr and Wrl to the brake ECU 10.

By combining the controls explained above, the ABS control which is executed upon occurrence of slipping at respective wheels Wfr, Wfl, Wrr and Wrl or a side-slip preventing control (ESC control, which stands for Electric Skid Control) which is executed upon occurrence of side-slipping at the vehicle 100 is executed.

The explanation on the operation of the friction brake device B will be briefly made hereinafter. The brake ECU 10 generates servo pressure in the servo chamber 1A by controlling the pressure increasing and decreasing valves 42 and 41 when the friction brake device B generates the "friction braking force Fmfr, Fmfl, Fmrr and Fmrl" at the respective corresponding wheels Wfr, Wfl, Wrr and Wrf. Then the first and the second master pistons 14 and 15 advance to pressurize the brake fluid in the first and the second master chambers 1D and 1E, respectively. The hydraulic pressure in the first and the second master chambers 1D and 1E (master pressure) is supplied to the wheel cylinders WCfr, WCfl, WCrr and WCrl as the "master pressure" from the ports 11g and 11i via the conduits 51 and 52, and the brake actuator 53. The friction braking forces Fmfr, Fmfl, Fmrr and Fmrl" are generated at the respective corresponding wheels Wfr, Wfl, Wrr and Wrf. The magnitudes of respective friction braking forces Fmfr, Fmfl, Fmrr and Fmrl depend on the uniformly applied hydraulic pressures. Thus, the friction brake device B can generate any arbitrary friction braking force Fmfr, Fmfl, Fmrr and Fmrl at corresponding wheels according to the operating amount inputted to the brake pedal 5.

Explaining more in detail, the ball valve 442 closes the through passage 444a of the valve seat portion 444 in the regulator 44 when the brake pedal 5 is not depressed and accordingly, the first chamber 4A and the second chamber 4B are separated from each other. The pressure decreasing valve 41 is in an open state and the pressure increasing valve 42 is in a closed state.

The pressure in the second chamber 4B is kept to be equal to the pressure in the servo chamber 1A which is in communication with the second chamber 4B through the conduit 163. The second chamber 4B is further in communication with the third chamber 4C via the passages 445c and 445d of the control piston 445. Accordingly, the second chamber 4B and the third chamber 4C are in communication with the reservoir 171 via the conduits 414 and 161. One end of the pilot chamber 4D is closed by the pressure increasing valve 42 and the other end thereof is in communication with the reservoir 171 through the pressure decreasing valve 41. The pressures in the pilot chamber 4D and the second chamber 4B are kept to the equal pressure level.

From this state, when the brake pedal 5 is depressed by the operator of the vehicle, the brake ECU 10 calculates the "required braking force Fd" at a required braking force calculating portion 27 based on the detection signal from the stroke sensor 72. Further, a friction braking force Fm is calculated by subtracting the regeneration braking force Fc from the required braking force Fd. In order to generate the required hydraulic pressure which achieves the calculated "friction braking force Fm", a feed-back control is performed to the pressure decreasing valve 41 and the pressure increasing valve 42. In other words, the brake ECU 10 controls the pressure decreasing valve 41 to be closed and the pressure increasing valve 42 to be opened.

By the opening of the pressure increasing valve 42, the communication between the accumulator 431 and the pilot chamber 4D is established. By the closing of the pressure decreasing valve 41, the communication between the pilot chamber 4D and the reservoir 171 is interrupted. The pressure in the pilot chamber 4D (pilot pressure) can be raised by the highly pressurized brake fluid supplied from the accumulator 431. By the raising of the pilot pressure, the control piston 445 slidably moves towards the cylinder bottom surface side (in the arrow A3 direction). Then the tip end of the projection portion 445b of the control piston 445 is brought into contact with the ball valve 442 and the passage 445d is closed by the ball valve 442. Then the communication between the second chamber 4B and the reservoir 171 is interrupted.

Further, by the slidable movement of the control piston 445 towards the cylinder bottom surface side (in the arrow A3 direction), the ball valve 442 is pushed towards the cylinder bottom surface side (in the arrow A3 direction) by the projection portion 445b to thereby separate the ball valve 442 from the valve seat portion 444. This allows establishment of fluid communication between the first chamber 4A and the second chamber 4B through the through passage 444a of the valve seat portion 444. Since the first chamber 4A is supplied with the highly pressurized brake fluid from the accumulator 431, this establishment of the communication increases the pressure in the second chamber 4B.

With the increase of pressure in the second chamber 4B, the pressure (servo pressure Ps) in the servo chamber 1A provided in the master cylinder 1 which is in communication with the second chamber 4B also increases. By the increase of the servo pressure Ps, the first master piston 14 advances thereby to increase the pressure (master pressure) in the first master chamber 1D. Then, the second master piston 15 also advances thereby to increase the pressure (master pressure) in the second master chamber 1E. By the increase of the pressure in the first master chamber 1D, the highly pressurized brake fluid is supplied to the brake actuator 53. The highly pressurized (master pressure) brake fluid is supplied uniformly to the respective wheel cylinders WCfr, WCfl, WCrr and WCrl via the brake actuator 53. Thus, the brake operation is performed for the vehicle. The force which advances the first piston 14 forward corresponds to the force corresponding to the servo pressure Ps.

When the brake operation is released, oppositely, the pressure decreasing valve 41 becomes in the open state to establish the communication between the reservoir 171 and the pilot chamber 4D, whereas the pressure increasing valve 42 becomes in the closed state. Thus, the control piston 445 retreats and the friction brake device returns to the state before the operator of the vehicle operates the brake pedal 5.

Under the normal braking operation, the brake actuator 53 makes all of the electromagnetic valves to be under non-energized state so that the brake hydraulic pressure, i.e., the basic hydraulic pressure which corresponds to the operation force of the brake pedal 5 is uniformly distributed to the wheel cylinders WCfr, WCfl, WCrr and WCrl.

When the motor 535 for pump drive, i.e., the pumps 534 and 545 are actuated and at the same time the pressure differential control valves 530 and 550 are energized, a brake hydraulic pressure which is the total of the basic hydraulic pressure from the master cylinder 1 and the controlled hydraulic pressure can be supplied to the respective wheel cylinders WCfr, WCfl, WCrr and WCrl.

Further, the brake actuator 53 controls the pressure increasing valves 531, 537, 541 and 543 and the pressure decreasing valves 532, 536, 542 and 544 by monitoring the signals from the pressure sensor so that the hydraulic pressures in the wheel cylinders WCfr, WCfl, WCrr and WCrl can be individually adjusted. Thus, upon receipt of the instructions from the brake ECU 10, for example, a well-known side-slip preventing control (ESC: more specifically, the under steer control, over steer control) or the ABS control can be performed.

(Hybrid ECU 9)

The hybrid ECU 9 is formed by a well-known microprocessor having a CPU, a ROM, a RAM and an I/O interface and various calculation processes and controls can be executed according to the programs memorized in the ROM or the like. The hybrid ECU 9 is communicably connected to the brake ECU 10. The hybrid ECU 9 monitors and controls the charging condition of the battery 7.

The hybrid ECU 9 calculates the "maximum regeneration braking force" and outputs the calculated "maximum regeneration braking force" to the brake ECU 10 at every set constant time period. The "maximum regeneration braking force" means the maximum regeneration braking force on a moment to moment basis that the regeneration brake device A can generate. The hybrid ECU 9 calculates the rotation speed of the motor/generator Mg based on a vehicle speed and calculates the "maximum regeneration braking force" by referencing the rotation speed of the motor/generator Mg and the battery charging amount (SOC: State Of Charge) to the mapping data (not shown). The smaller the rotation speed of the motor/generator Mg, the larger the "maximum regeneration braking force" can be calculated and the smaller the SOC, the larger the "maximum regeneration braking force" can be calculated.

Further, the hybrid ECU 9 executes the regeneration braking operation in cooperation with the brake ECU 10. More specifically, the hybrid ECU 9 drives the motor/generator Mg by the rotation force of the right/left front wheels Wfr and Wfl based on the "required regeneration braking force" obtained from the brake ECU 10 and generates electricity, whereby the required regeneration braking force is generated by the driven motor/generator Mg. In other words, the vehicle motion energy is converted into the electric energy by the motor/generator Mg and the converted electric energy is charged in the battery 7 through the inverter 6.

(Brake ECU 10)

As shown in FIG. 1, the brake ECU 10 is communicably connected to the hybrid ECU 9 and is formed by a well-known microprocessor having a CPU, a ROM, a RAM and an I/O interface and so on and various calculation processes and controls can be executed according to the programs memorized in the ROM or the like. The brake ECU 10 is connected to the various sensors Sfr, Sfl, Srr and Srl and 72 through 75 for controlling the electromagnetic valves 22, 25, 41, 42, 531 and 532 and the motors 433 and 535 and so on. The brake ECU 10 calculates the vehicle speed V which is a speed of the vehicle obtained based on the detection signals from the wheel speed sensors Sfr, Sfl, Srr and Srl and outputs the detected vehicle speed V to the hybrid ECU 9.

The brake ECU 10 controls the brake actuator 53 to on-off control the electromagnetic valves 531 and 532 and so and to actuate the motor 53 when necessary on based on the master pressure, the state of each wheel speed and front/rearward acceleration and so on. Thus the ABS (Anti-lock Brake Control) control is performed, wherein the brake hydraulic pressures applied to the wheel cylinders WCfr, WCfl, WCrr and WCrl, i.e., the friction braking forces Fmfr, Fmfl, Fmrr and Fmrl applied to the wheels Wfr, Wfl, Wrr and Wrl are individually adjusted.

Further, the brake ECU 10 controls the brake actuator 53 to control the pressure differential control valve 530 and each electromagnetic valve 531 and 532 and so on, as well as to actuate the motor 535, based on the steered angle of the steering wheel 37a, actual yaw rate Ya and the vehicle speed V and so on, thereby to generate hydraulic pressure differential between the wheel cylinders WCfr and WCfl or between the wheel cylinders WCrr and WCrl. In other words, by generating the friction braking force differential ΔFm between the wheels Wfr and Wfl and between the wheels Wrr and Wrl, the ESC control is executed.

Further, the brake ECU 10 executes a cooperative control (regeneration cooperative control) to make the regeneration braking force Fc generated by the motor/generator Mg and the friction braking force Fm cooperate with each other so that the total braking force of the vehicle 100 becomes equal to the braking force of another type of vehicle which braking operation is performed only by the friction braking force. In more specifically, the brake ECU 10 adjusts the brake hydraulic pressure in response to the required regeneration braking force Fcd and the braking requirement of the operator of the vehicle. The total braking force applied to the vehicle by the requirement of braking by the operator of the vehicle is referred to as "required braking force Fd".

The "required braking force Fd" is calculated by the required braking force calculating portion 27 based on the stroke amount (operating amount) St (displacement amount of input piston 13) of the brake pedal 5 detected by the stroke sensor 72. However, the calculation method is not limited to the above. For example, the required braking force Fd may be obtained by the stroke amount St of the brake pedal 5 and the pressure which corresponds to the operating force of the brake pedal 5 detected by the hydraulic pressure sensor 73 (reaction force sensor). The brake ECU 10 obtains the "maximum regeneration braking force Fcmax" which can be generated at the current time in every predetermined fixed time period (for example, in every several micro seconds) from the hybrid ECU 9. Then the brake ECU 10 calculates the "friction braking force Fm" by subtracting the "regeneration braking force Fc" which is set to be equal to or less than the "maximum regeneration braking force Fcmax" based on the required regeneration braking force Fcd from the "required braking force Fd".

The CPU included in the brake ECU 10 executes the flowcharts 1 through 4 shown in FIGS. 6, 8, 10 and 12 to calculate the upper limit values or the like of the regeneration braking forces Fcfr and Fcfl to be generated by the right/left front wheels Wfr and Wfl. In the programs for executing the above flowcharts, the brake ECU 10 includes the required braking force calculating portion 27, a maximum braking force calculating portion 29, a vehicle motion control portion 30 and a braking force control portion 31. (See FIG. 1).

The required braking force calculating portion 27 is a portion for calculating the required braking force Fd which realizes the deceleration required for the vehicle 100 based on the stroke amount St (brake operating amount) which corresponds to the depression amount of the brake pedal 5 by the operator of the vehicle. The stroke amount St can be obtained by the stroke sensor 72 provided in the vicinity of the brake pedal 5. The required braking force Fd is the total braking force to be generated at the respective wheels Wfr, Wfl, Wrr and Wrl. According to this embodiment, the required braking force Fd is achieved by the total of the regeneration braking force Fc which is generated by the regeneration control performed by the motor/generator Mg and the friction braking force Fm which is generated by the friction brake device B. It is noted here that the required braking force Fd may be obtained from a mapping data prepared corresponding to the brake operating amount of the brake pedal 5 in advance or may be obtained by calculation.

The maximum braking force calculating portion 29 calculates the maximum braking force Ffrmax, Fflmax, Frrmax and Frlmax which are the respective maximum applicable braking forces to the respective corresponding wheels Wfr, Wfl, Wrr and Wrl without causing excessive slip of the wheels Wfr, Wfl, Wrr and Wrl. In detail, the maximum braking forces Ffrmax, Fflmax, Frrmax and Frlmax which are the respective maximum generable braking forces to the respective wheels Wfr, Wfl, Wrr and Wrl in a rotation direction based on each lateral force Fyfr, Fyfl, Fyrr and Fyrl generated in a right angle direction relative to the rotation direction of the respective wheels Wfr, Wfl, Wrr and Wrl in response to the centrifugal force generated at the vehicle 100 and the road surface limit friction forces Smfr, Smfl, Smrr and Smrl of the respective wheels Wfr, Wfl, Wrr and Wrl. It is noted here that hereinafter the lateral force Fyfl, the road surface limit friction force Smfl and the maximum braking force Fflmax of the left front wheel Wfl will be explained, representing those of the other wheels. The remaining values of the other wheels Wfr, Wrl and Wrr are similar to those of the wheel Wfl, and accordingly the explanations thereof will be omitted.

Figure 4:
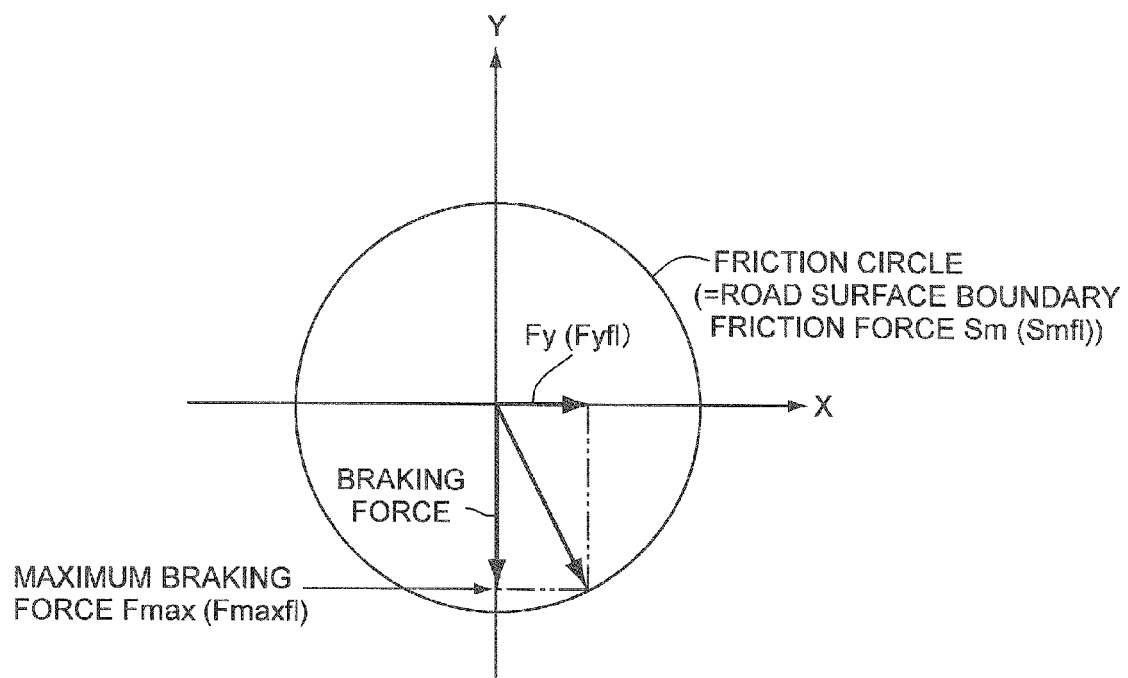
FIG. 4 illustrates a friction circle explaining a lateral force, a braking force and so on generated at each wheel of the vehicle.

First, the road surface limit friction force Smfl of the left front wheel Wfl will be explained. The road surface limit friction force Smfl means an allowable maximum braking force to the left front wheel Wfl such that a slipping would not be generated at the left front wheel Wfl on the road surface, when the vehicle 100 is running straight forward and the lateral force is not generated at the left front wheel Wfl. This road surface limit friction force is generally illustrated by a friction circle for explanation as shown in FIG. 4. The road surface limit friction force Smfl is calculated by the road surface friction coefficient μ of a running road surface on which the left front wheel Wfl is in contact and the left front wheel distributed load Pfl applied to the road surface from the left front wheel Wfl.

Upon the calculation above, as a method for presuming the road surface friction coefficient "μ", it is possible to adopt any of various already known methods. For example, the road surface friction coefficient μ can be obtained by using the method disclosed in a Japanese patent publication No. JP2012-25389 A. According to the technology disclosed in the JP patent publication, the road surface friction coefficient μ can be obtained by dividing the vehicle deceleration Gv under ABS control operation obtained by the acceleration sensor by the gravity acceleration "g" (μ=Gv/g). It is noted however, the calculation of the road surface friction coefficient μ is not limited to this method and the road surface friction coefficient μ may be presumed by any other methods.

Next, the obtaining method for the left front wheel distributed load Pfl will be explained. As a method for obtaining the left front wheel distributed load Pfl, it is possible to adopt any of various already known methods. For example, the left front wheel distributed load Pfl can be obtained by using the method disclosed in a Japanese patent publication No. JP2009-202780 A. According to the disclosed method, the distributed load Pfl applied to the left front wheel Wfl can be represented as the following mathematical formula (M1).

$$Pfl = Pfl_0 + \Delta W_{Gx}/2 + \Delta W_{Gy} \tag{M1}$$

Wherein, in the mathematic formula (M1), $\Delta W_{Gx}$ and $\Delta W_{Gy}$ represent the front/rearward direction load displacement amount and the right/left direction load displacement amount, respectively and are represented by the following formulae (M2) and (M3).

$$\Delta W_{Gx} = Mm \times Gx \times H/L \quad (M2)$$

$$\Delta W_{Gy} = (Pf_0 + \Delta W_{Gx}) \times Gy \times H/z \quad (M3)$$

Wherein, in each mathematic formula, "Mm" represents a vehicle weight, "H" represents the center of gravity height, "L" represents a wheel base, "z" represents a tread width, "Gx" represents front/rearward acceleration, "Gy" represents right/left direction (lateral) acceleration, "Pfl$_0$" represents the left front wheel distributed load at stopping (initial stage front wheel load) and "Pf$_0$" represents the front wheel load at stopping of both right and left wheels. Among these various values, the vehicle weight Mm, the center of gravity height "H", wheel base "L", tread width "z", the front wheel load at stopping Pfl$_0$ and the front wheel load at stopping of both right and left wheels Pf$_0$ are memorized in advance as the vehicle specifications and the front/rearward acceleration Gx and the right/left direction (lateral) acceleration Gy are calculated based on the detection signals from acceleration sensor. Similarly, the presumed load applied to the other wheels can be calculated by the well-known method as the presumed distributed load Pfl applied to left front wheel.

Further, by multiplying the calculated road surface friction coefficient μ by the left front wheel distributed load Pfl (μ×Pfl), for example, the friction circle (See FIG. 4) which indicates the magnitude of the braking force that can be allowed to the left front wheel Wfl, i.e., the road surface limit friction force Smfl of the left front wheel Wfl can be obtained. A friction circle size of one of wheels Wfr, Wfl, Wrr and Wrl is usually different from that of other wheels. When the respective friction braking forces generated against the respective wheels Wfr, Wfl, Wrr and Wrl between the wheels and the road surface with which the wheels Wfr, Wfl, Wrr and Wrl which are in contact is within the friction circle, the respective wheels Wfr, Wfl, Wrr and Wrl does not slip excessively and the vehicle is in stable state. It is noted that according to the embodiment, the Y-axis direction of the friction circle shown in FIG. 4 is regarded as the advancing direction (rotation direction) of the wheel Wfl.

Next, the maximum braking force calculating portion 29 calculates the lateral force Fyfl generated at the left front wheel Wfl when the operator of the vehicle rotates the steering wheel 37a in order to obtain the maximum braking force Fflmax from the road surface limit friction force Smfl. Since the method for obtaining the lateral force Fy has been known, detail explanation thereof will be omitted. As an example of such well-known technology, a method disclosed in a publication (T. IEE Japan, Vol. 120-D numbers 6 and 1004, which discloses "dynamic braking force distribution method for a four-wheel independently driven electric vehicle") can be indicated to obtain the lateral force. In other words, the lateral force Fy changes in non-linear shape in response to the slip angle α of the vehicle wheel and is calculated based on the slip angle α, the distributed load Pfl distributed to each vehicle wheel (for example, left front wheel Wfl) and the road surface friction coefficient μ. The slip angle α is an angle formed between the speed direction of the wheel and the wheel rotation surface and is calculated from the vehicle body slip angle β, vehicle speed V and actual yaw rate Ya.

Then, based on the calculated lateral force Fyfl and the road surface limit friction force Smfl (friction circle), the maximum braking force Fflmax which is the maximum amount in a braking force range wherein the left front wheel Wfl does not slip excessively. As explained with reference to FIG. 4, it is necessary for a braking force to be generated at the left front wheel Wfl to be set not to exceed the maximum braking force Fflmax so that the left front wheel Wfl may not slip excessively during the vehicle under turning movement. This is the same with the other wheels Wfr, Wrl and Wrr, when obtaining respective maximum braking forces Ffrmax, Frlmax and Frrmax.

The vehicle motion control portion 30 is a processing portion for distributing the required braking force Fd to the right/left front wheels Wfr and Wfl (regeneration braking side right/left wheels) which are the one side of the right/left wheels and to the right/left rear wheels Wrr and Wrl (non-regeneration braking side right/left wheels) which are the other side of the right/left wheels by calculation based on the obtained data, such as vehicle speed V, steering angle of the steering wheel 37a and yaw rate or the like. According to the embodiment, the vehicle motion control portion 30 sets the ratio of distribution of braking force to the front wheels and the rear wheels (front/rear wheel braking force distribution ratio) to a ratio between the ratio of 10:0 (See point "a1" in FIG. 5) and the ratio of 6:4 (See point "a2" in FIG. 5).

For example, the front/rear wheel braking force distribution ratio may be set to 10:0 when the vehicle 100 is running straight forward under a predetermined speed V When the vehicle speed V is increased and exceeds the predetermined speed, the front/rear wheel braking force distribution ratio may be changed to a ratio shifted from the ratio of 10:0 toward the ratio of 6:4 by shifting the braking force of predetermined amount to the rear wheels in order to prevent the vehicle from making strong nose diving. The front/rear wheel braking force distribution ratio may be displaced to a ratio shifted from the ratio 10:0 toward the ratio 6:4 when the vehicle 100 is running under turning motion and a probability of side-slipping of any of the wheels is detected. The setting of the distribution ratio may be desirably made and respective distribution ratios for respective vehicle conditions may be made in advance based on the experiments or the like. It is noted that the front/rear wheel braking force distribution ratio of 6:4 is considered to be an ideal distribution ratio in braking operation. However, it is not limited to the ratio of 6:4, but the ratio may be set between 10:0 and 7:3.

Figure 5:
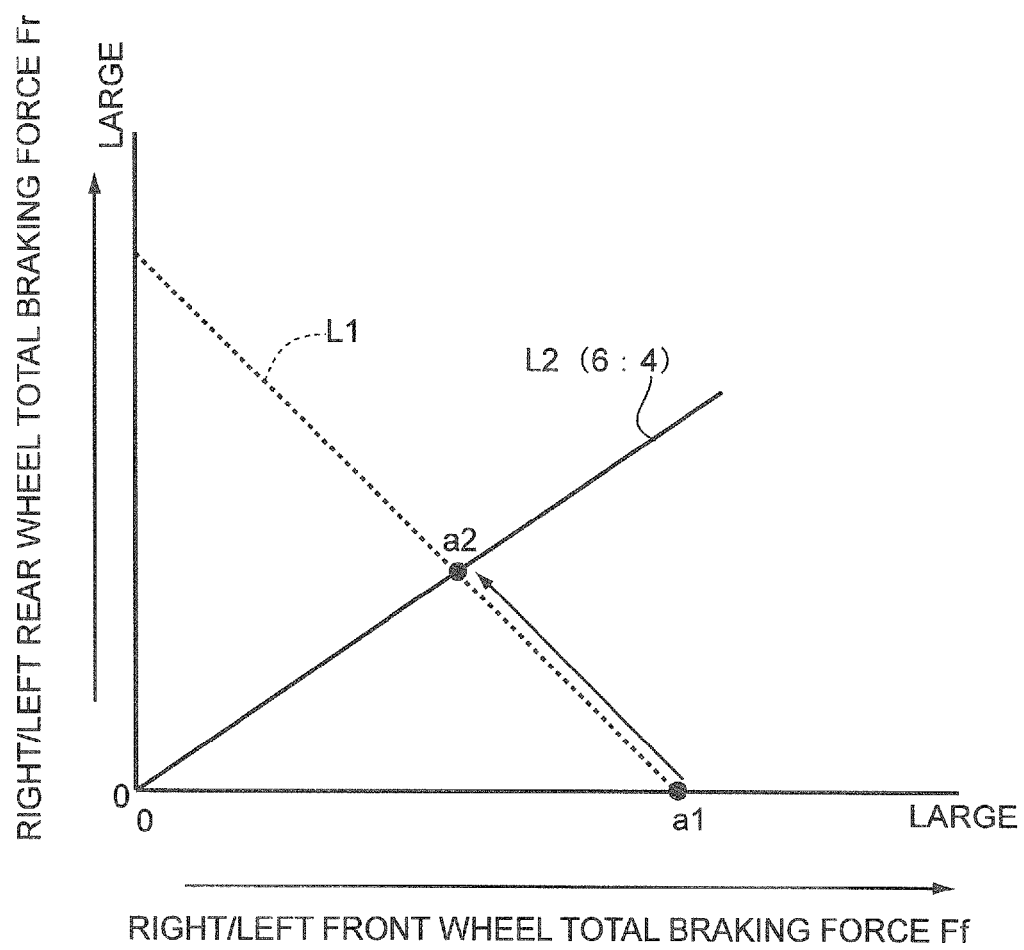
FIG. 5 is a graph explaining a distribution relationship of the braking force at the front and rear wheels.

It is noted that FIG. 5 shows the graph wherein the vertical axis indicates the total braking force distributed to the right/left rear wheels Wrr and Wrl and the horizontal axis indicates the total braking force distributed to the right/left front wheels Wfr and Wfl. The line "L1" in the graph shows the equal deceleration line, a point a1 being set as a basis (starting from). The line "L2" in the graph shows the ideal front/rear wheel braking force distribution ratio line as explained above and more concretely, indicates the front/rear wheel braking force distribution ratio of 6:4.

Further, the total value of Ff and Fr of the braking force distributed to the right/left front wheels Wfr and Wfl and the right/left rear wheels Wrr and Wrl is controlled to be always the required braking force Fd. Accordingly, even when the vehicle motion control portion 30 changes the front/rear wheel braking force distribution ratio during the vehicle being running, the braking force is generated always along on the same deceleration line (L1 in FIG. 5) in response to the depression amount of the brake pedal 5 and therefore the operator of the vehicle does not feel any uncomfortable feeling.

Next, the explanation of the braking force control portion 31 will be made. The braking force control portion 31 calculates the regeneration braking force Fcf (Fcfr, Fcfl) to be set at the right/left front wheels Wfr and Wrl, based on the braking force Ff distributed to the right/left front wheels Wfr and Wfl by the vehicle motion control portion 30. According to the embodiment, because of the structural reasons, the regeneration braking forces Fcfr and Fcfl are generated with the same amount to the right/left front wheels Wfr and Wfl. Under this condition, the braking force control portion 31 sets the regeneration braking forces Fcfr and Fcrl to be generated at the right/left front wheels Wfr and Wfl not to exceed the smaller value (hereinafter min (Ffrmax, Fflmax)) between the values of the maximum braking forces Ffrmax and Flmax of the respective right/left front wheels Wfr and Wfl. Accordingly, in this embodiment, respective regeneration braking forces Fcfr and Fcfl is set to be equal to the value min (Ffrmax, Fflmax). In other words, the total (Fcf) of regeneration barking forces Fcfr and Fcfl becomes the value min (Ffrmax, Fflmax) by two (2).

At this time, for example, when the vehicle 100 is running straight and no lateral forces Fyfl and Fyfl are generated at respective wheels, the respective maximum braking forces Ffrmax and Fflmax of the right/left wheels Wfr and Wfl becomes equal to the road surface limit friction force Smfr and Smfl (friction circle). Accordingly, the regeneration braking force Fcfr, Fcfl is set to be equal to the smaller road surface friction force min (Smfr, Smfl) between the road surface limit friction forces Smfr and Smfl (friction circle) of the right/left front wheels Wfr and Wfl. (Fcfl=Fcfr)

When the steering wheel 37a is rotated and the lateral forces Fyfl and Fyfr are generated at both right/left front wheels, the regeneration braking force Fcfl (or Fcfr) is set to be the value (min (Fflmax, Ffrmax)) which is the smaller value between the maximum braking forces Fflmax and Ffrmax of the left front wheel Wfl and the right front wheel Wfr. Accordingly, the total regeneration braking force Fcf generated at the left front wheel Wfl and the right front wheel Wfr becomes the value twice as much as the value min (Fflmax, Ffrmax), "2×value min (Fflmax, Ffrmax)".

It is noted that when the regeneration raking force Fcf is set to be the value (Fcf=2×min (Fflmax, Ffrmax) as explained above, there may be a case where all of the braking forces Ff distributed to the right/left front wheels Wfr and Wfl cannot be set to the right/left front wheels Wfr and Wfl. In such case, if possible, the overflowing (surplus) braking force can be generated by the friction braking force Fm at either of the right/left front wheels Wfr and Wfl or the right/left rear wheels Wrr and Wrl.

(Operation of Brake Controller According to First Embodiment)

Next, the operation (processing), which is executed by the brake ECU 10, of the brake controller according to the first embodiment will be explained with reference to the flowchart 1 of FIG. 6 and explanation shown in FIG. 7. FIG. 7 shows the maximum braking forces Fflmax, Ffrmax, Frlmax and Frrmax at respective wheels Wfl, Wfr, Wrl and Wrr and the braking forces Fcf and Fmr which are generated at corresponding wheel Wfl, Wfr, Wrl and Wrr and so on. It is noted that the flowchart 1 explains the case that the friction brake device B controls braking operation at respective wheels Wfl, Wfr, Wrl and Wrr independently by the operation of the brake actuator 53 and so on.

Figure 6:
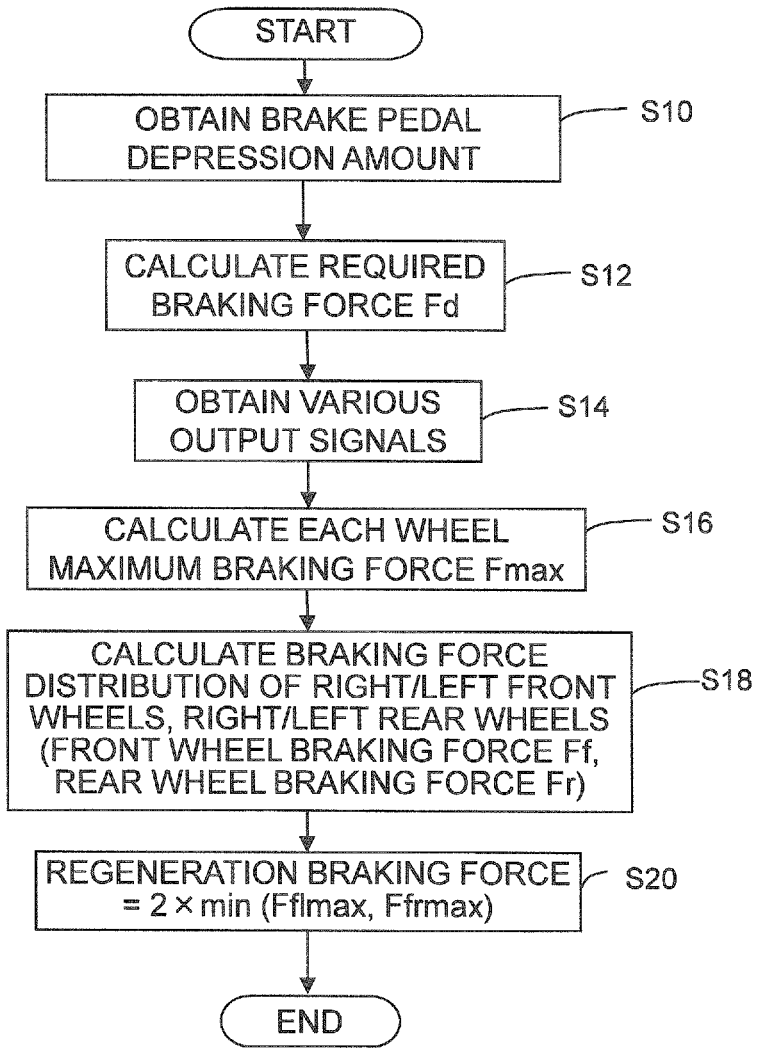
FIG. 6 is a flowchart 1 illustrating a control program to be executed at the brake ECU ("Electronic Control Unit") according to a first embodiment.
Figure 7:
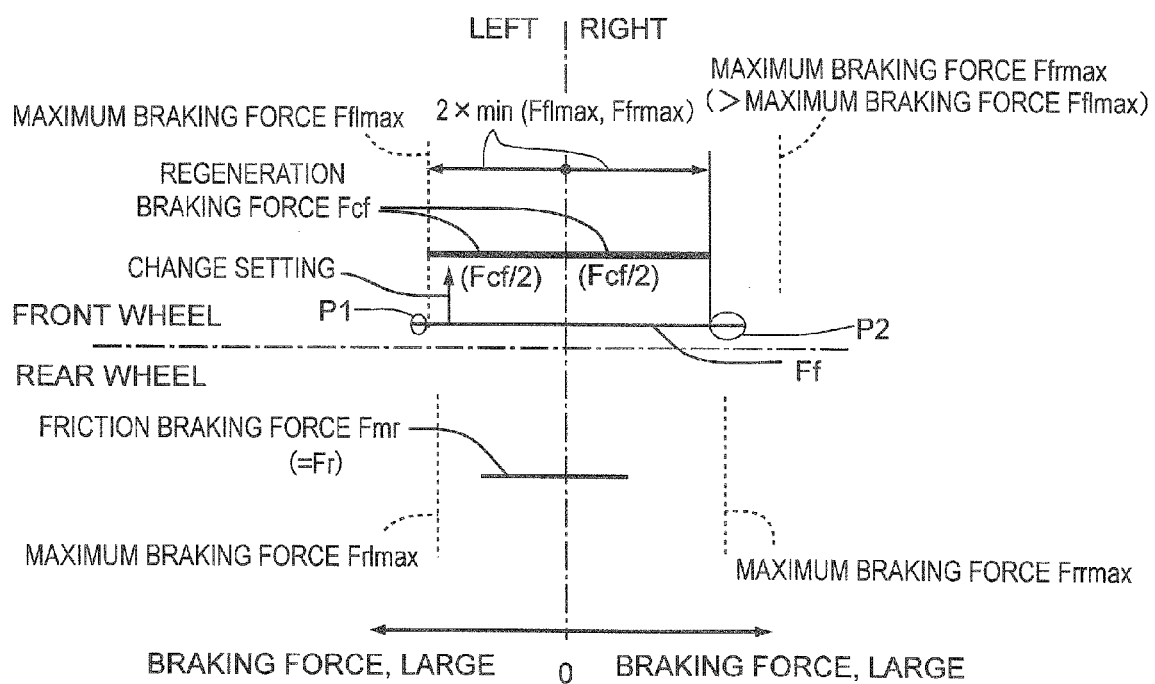
FIG. 7 is a view explaining the state of braking force generated at each wheel by the operation of the flowchart 1.

As indicated with the step S10 of the flowchart 1 in FIG. 6, when the vehicle 100 starts running, the brake ECU 10 obtains the output signal of the stroke sensor 72 which is a reference of the stroke amount (brake operating amount) of the brake pedal 5.

At the step S12 (processing portion of the required braking force calculating portion 27), as explained above, the required braking force Fd which corresponds to the deceleration required to the vehicle 100 is calculated based on the output signal from the stroke sensor 72. The required braking force Fd may be obtained from the mapping data set in advance, or may be obtained by the calculation.

At the step S14, various output signals are obtained. These various output signals include the signals from the stroke sensor 72, vehicle wheel speed sensors Sfr, Sfl, Srr and Srl, acceleration sensor 39, steering sensor 37b and yaw rate sensor 38.

At the step S16 (processing portion of the maximum braking force calculating portion 29), the maximum braking forces Fflmax, Ffrmax, Frlmax and Frrmax at respective wheels Wfl, Wfr, Wrl and Wrr are calculated based on respective lateral forces Fyfl, Fyfr, Fyrl and Fyrr and respective road surface limit friction forces Smfl, Smfr, Smrl and Smrr.

At the step S18 (processing portion of the vehicle motion control portion 30), the required braking force is distributed to the right/left front wheels Wfr and Wfl and the right/left rear wheels Wrr and Wrl at the distribution ratio therebetween in the range between 10:0 and 6:4, based on the steered angle obtained by the output signal from the steering sensor 37b and the vehicle speed V obtained by the output signals from the vehicle wheel speed sensors Sfr, Sfl, Srr and Srl and so on. It is noted here that in the flowchart 1, it is determined that the friction braking forces Fmrr and Fmrl distributed to the right/left front wheels Wrr and Wrl do not exceed the maximum braking forces Frrmax and Frlmax of the right/left rear wheels Wrr and Wrl, respectively as is shown in FIG. 7. Further, it is noted that the braking force distributed to right/left front wheels Wfr and Wfl is defined to be the braking force Ff and the braking force distributed to the right/left rear wheels Wrr and Wrl is defined to be the braking force Fr (=Fmrr+Fmrl).

Next, at the step S20 (processing portion of the braking force control portion 31), the regeneration forces Fcfr and Fcfl (in this case, Fcfr=Fcfl) which are set to the right/left front wheels Wfr and Wfl are calculated.

At the step S20, as shown in FIG. 7, the regeneration braking force Fcf is set to be the value twice as much as the smaller value min (Fflmax, Ffrmax) between the values of the maximum braking forces at the right/left front wheels Wfr and Wfl. It is noted here that as indicated in FIG. 7, when the distributed braking force Ff is larger than the value of the min (Fflmax, Ffrmax) multiplied by two (2), a portion of the braking force Ff is not set as the regeneration braking force Fc but is cut. In this situation, the cut braking forces P1 and P2 may be generated as the friction braking force Fm at the right front wheel Wfr, in case that such cut braking forces P1 and P2 can be generated at the right front wheel Wfr. However, if all of the braking forces P1 and P2 are not set at the right front wheel Wfr, then they may be generated as the friction braking force Fm at the right/left rear wheels Wrr and Wrl. However, it is necessary to set such that the total of the braking forces at respective wheels shall not exceed the maximum braking forces Fflmax, Ffrmax, Frlmax and Frrmax at respective wheels.

Further, when the distributed braking force Ff is smaller than the value of min (Fflmax, Ffrmax) multiplied by two (2), the regeneration braking force is set to be the regeneration braking force Fcf=2×min (Fflmax, Ffrmax) or the braking force Ff is set to be the regeneration braking force Fcf without any change. If the regeneration braking force Fcf is set to be the regeneration braking force Fcf=2×min (Fflmax, Ffrmax), it is preferable to set the total braking force of respective braking forces at respective wheels becomes equal to the required braking force Fd by subtracting the added braking force from the braking force Fr distributed to the right/left rear wheels Wrr and Wrl, the added braking force being added to the distributed braking force so that the braking force Ff becomes the value of "2×min (Fflmax, Ffrmax)".

As apparent from the explanation above, according to the first embodiment, within the range where each gripping force of each of the right/left front wheels Wfr, Wfl is secured, the motion energy of the vehicle 100 is recovered as the electric energy to thereby effectively improve the fuel efficiency. Further, if the set regeneration braking force Fcf is generated at the right/left front wheels Wfr and Wfl, since the regeneration braking force Fcfr, Fcfl is set not to exceed the maximum braking force Ffrmax, Frlmax at each wheel, the gripping force at each right/left front wheel Wfr, Wfl (regeneration braking side right/left wheels) can be suitably assured.

Second Embodiment

Next, the second embodiment will be explained. According to the second embodiment, a braking force control portion 32 is provided which is different in a portion from the braking force control portion 31 of the first embodiment (See FIG. 1). The braking force control portion 32, in addition to the control of the braking force control portion 31, sets the regeneration braking force Fcf to be generated at the right/left front wheels Wfr and Wfl to a value equal to or less than a value obtained by subtracting the minimum friction braking force (hereinafter, referred to as "rear wheel minimum braking force Frmin") that must be generated at the right/left rear wheels Wrr and Wrl. The rear wheel minimum braking force Frmin is set by the vehicle motion control portion 30 in order to have the posture of the vehicle 100 to be stable during the braking operation. The rear wheel minimum braking force Frmin is set based on the required braking force Fd, the steered angle, the vehicle speed V, the front/rear acceleration, lateral acceleration, yaw rate and so on. It is not fixed how the value of the rear wheel minimum braking force Frmin is decided and any known deciding method may be applied. The operation and structure of the second embodiment are the same as those of the first embodiment, and the explanation thereof will be omitted and different points only will be explained hereinafter.

Figure 8:
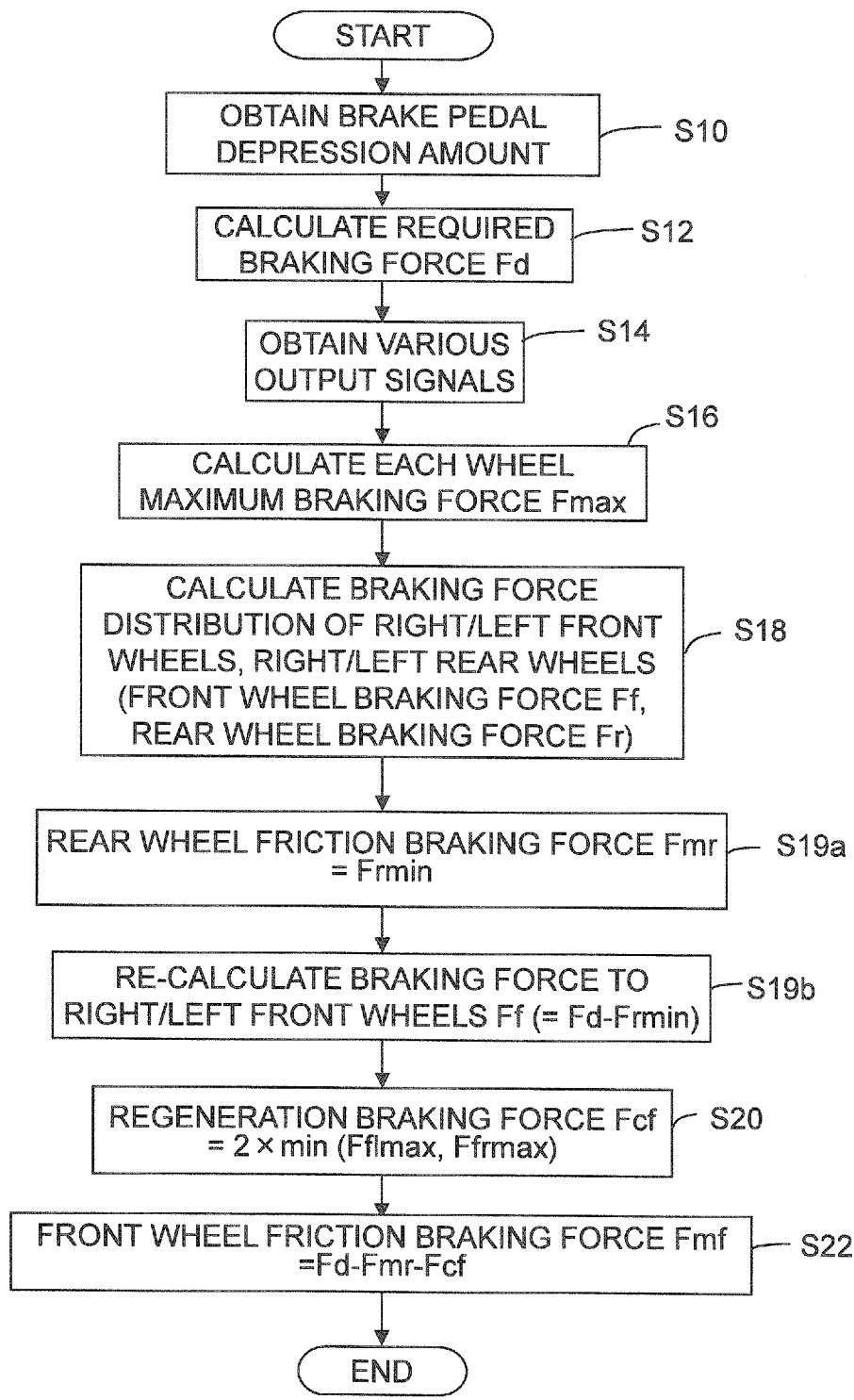
FIG. 8 is a flowchart 2 illustrating a control program to be executed at the brake ECU ("Electronic Control Unit") according to a second embodiment.
Figure 9:
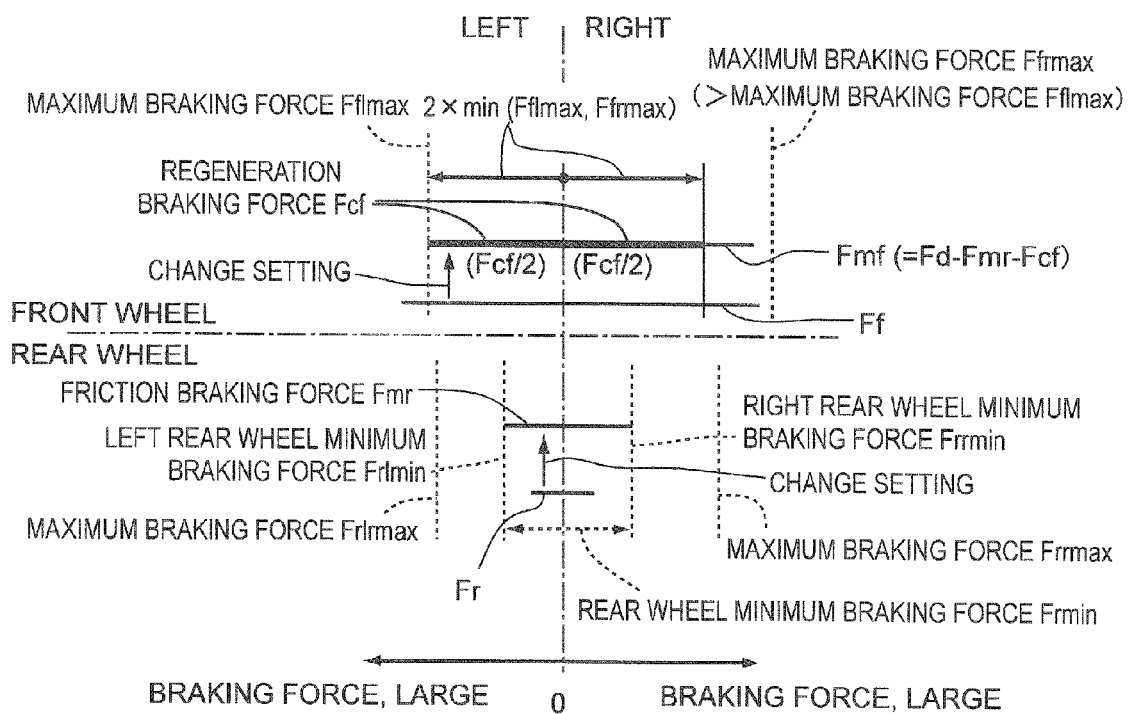
FIG. 9 is a view explaining the state of braking force generated at each wheel by the operation of the flowchart 2.

The operation of the second embodiment will be explained with reference to the flowchart 2 shown in FIG. 8 and explanation shown in FIG. 9. FIG. 9 shows the maximum braking force Fflmax, Ffrmax, Frlmax and Frrmax of each wheel Wfl, Wfr, Wrl and Wrr and the braking force to be generated at each wheel Wfl, Wfr, Wrl and Wrr. The flowchart 2 differs from the flowchart 1 in the addition of the steps S19a, S19b and the step S22 to the flowchart 1. The steps S10 to S18 and the step S20 are the same with those of the first embodiment and therefore only the changed portions will be mainly explained.

At the step S18 (processing portion of the vehicle motion control portion 30), after the front and rear braking forces are distributed as similar to the distribution in the flowchart 1, the program goes to the step S19a (processing portion of the braking force control portion 32) and the friction braking force Fmr to the right/left rear wheels Wrr and Wrl is set to be the rear wheel minimum braking force Frmin. At the step S19a, when the braking force Fr is larger than the rear wheel minimum braking force Frmin, the braking force portion overflowing from the rear wheel minimum braking force Frmin is cut and when the braking force Fr is smaller than the rear wheel minimum braking force Frmin, the deficient braking force portion short of the rear wheel minimum braking force Frmin is added when the friction braking force Fmr is set. It is noted that FIG. 9 indicates the case where the braking force Fr is smaller than the rear wheel minimum braking force Frmin. In a case where the deficient braking force is added when the friction braking force Fmr is set, the settings of respective friction braking forces Fmrl and Fmrr are made so that the friction braking forces Fmrl and Fmrr do not exceed respective maximum braking forces Frlmax and Frrmax at respective wheels Wrl and Wrr. It is not limited to the above method, the overflowing braking force Fr from the rear wheel minimum braking force Frmin may not be cut and may be set as the braking force Fmr without any change.

Next, at the step S19b, the braking force Ff to the right/left front wheels Wfr and Wfl is re-calculated according to the arithmetic formula (required braking force Fd−rear wheel minimum braking force Frmin).

Then at the step S20 (processing portion of the braking force control portion 32 and the content of which is the same with the braking force control portion 31), similar to the first embodiment, the regeneration force Fcf (=Fcfr+Fcfl) set to the right/left front wheels Wfr and Wfl are calculated to be the value of 2×min (Fflmax, Ffrmax) (See FIG. 9). It is noted that the value of the regeneration braking force Fcf may be set to be smaller than the value "2×min (Fflmax, Ffrmax)".

Next, at the step S22, the front wheel friction braking force Fmf set to the right/left front wheels Wfr and Wfl is calculated based on the arithmetic formula (required braking force Fd−rear wheel minimum braking force Frmin−regeneration braking force Fcf) (See FIG. 9). It is noted here that the sum of the regeneration braking force Fcf and the friction braking force Fmf at the front wheels Wfr and Wfl is set such that respective braking forces at respective wheels does not exceed the respective maximum braking forces Fflmax and Ffrmax.

According to the second embodiment, the vehicle 100 effectively collects the regeneration energy by the right/left front wheels Wfr and Wfl (regeneration right/left wheels) and while recovering the regeneration energy, a stable braking state can be maintained by the minimum friction braking force Fmrmin assured at the right/left rear wheels Wrr and Wrl (non-regeneration braking side right/left wheels).

Third Embodiment

Next, the third embodiment will be explained. According to the third embodiment, a braking force control portion 33 is provided which is different in a portion from the braking force control portions 31 and 32 of the first and the second embodiments (See FIG. 1). The braking force control portion 33 sets the right/left distribution ratio of the braking force Fr to the right/left rear wheels Wrr and Wrl in order to have the vehicle posture to be in a stable state. When the braking force control portion 33 sets the right/left distribution ratio of the braking force, the friction brake device B is operated to generate the friction braking forces Fmrr and Fmrl based on the right/left distribution ratio.

At this time, as will be later explained in detail, when the friction braking force Fmrr to be generated at one wheel (for example, at the right rear wheel Wrr) of the right/left rear wheels Wrr and Wrl, exceeds the maximum braking force Frrmax at the right rear wheel Wrr, the braking force control portion 33 subtracts the excess friction braking force ΔFb from the braking force to be generated at the right rear wheel Wrr and at the same time adds the excess braking force ΔFb to the braking force to be generated at the other wheel (for example, to the left rear wheel Wrl) of the both wheels. Further, when the friction braking force Fmrl to be generated at the other wheel (for example, at the left rear wheel Wrl) of the right/left rear wheels Wrr and Wrl falls below the minimum friction braking force Frlmin at the left rear wheel Wrl, the braking force control portion 33 adds the amount of braking force which is the insufficient amount of friction braking force ΔFa (deficient friction braking force short of the minimum friction braking force) to the braking force to be generated at the left rear wheel Wrl (the other of wheels) and at the same time subtracts the deficient friction braking force ΔFa from the braking force to be generated at the right rear wheel Wrr (the one of wheels). It is noted that "the one" wheel may be the left rear wheel Wrl and "the other" wheel may be the right rear wheel Wrr.

Figure 10:
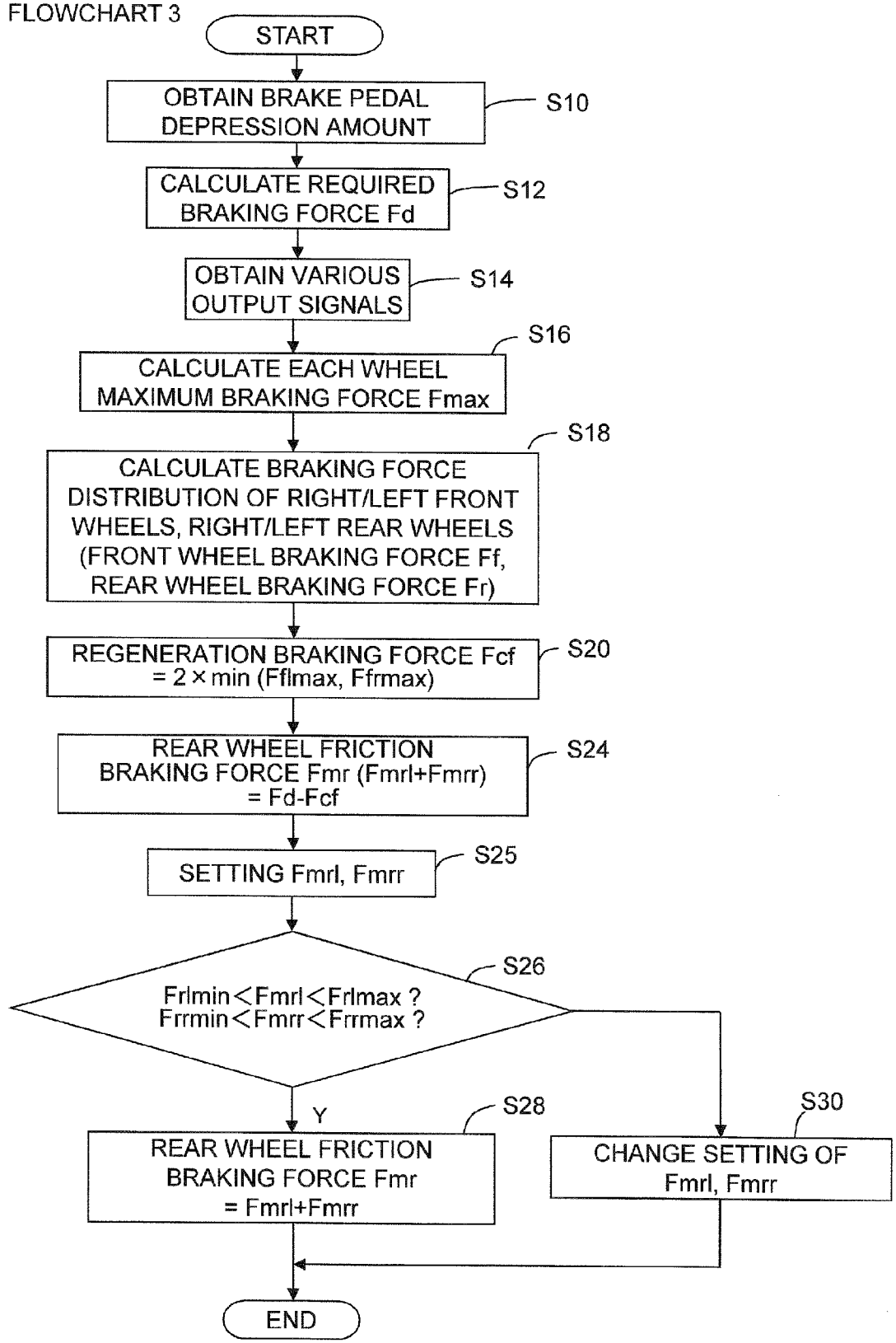
FIG. 10 is a flowchart 3 illustrating a control program to be executed at the brake ECU ("Electronic Control Unit") according to a third embodiment.

Regarding the portions of the third embodiment other than the above, the operation and the structure are the same to the first and the second embodiments and the explanation thereof will be omitted and different portions will be explained hereinafter with reference to the flowchart 3 shown in FIG. 10 and the explanation in FIG. 11. The flowchart 3 is different from the flowchart 1 in the addition of the steps S24 to S30. The steps S10 to 20 are the same with those in the flowchart 1.

At the step S24 (processing portion of the braking force control portion 33), the rear wheel friction braking force Fmr is calculated by subtracting the regeneration braking force Fcf calculated at the step S20 from the required braking force Fd. Further, at the step S25 (processing portion of the braking force control portion 33), the friction braking force Fmrl at the left rear wheel Wrl and the friction braking force Fmrr at the right rear wheel Wrr are respectively set. The settings thereof are performed for the purpose of keeping the posture of the vehicle 100 to be in a stable state and setting method thereof may be freely selected. According to this embodiment, the values of the friction braking force Fmrl and the friction braking force Fmrr are set with different values from each other.

Next, at the step S26, whether or not the respective friction braking forces Fmrl and Fmrr set at the step S25 is smaller than respective maximum braking forces Frlmax and Frrmax of respective wheels is judged. At the same time, at the step S26, whether or not the respective friction braking forces Fmrl and Fmrr set is larger than respective rear wheel minimum braking forces Frlmin and Frrmin at the left and right rear wheels is judged. It is noted that as stated above, respective rear wheel minimum braking forces Frlmin and Frrmin at the left and right rear wheels indicates the braking force necessary for running the vehicle in a stable state. In other words, the distribution of the respective friction braking forces Fmrl and Fmrr to the left and right rear wheels Wrl and Wrr should be made within the range where respective friction braking forces Fmrl and Fmrr is equal to or more than respective rear wheel minimum braking forces Frlmin and Frrmin which is a minimum necessary requirement at the left and right rear wheels and is equal to or less than respective maximum braking forces Frlmax and Frrmax. When the above both conditions are satisfied, the program goes to the step S28 and the rear wheel friction braking force Fmr (Fmrl+Fmrr) is set according to the setting processing of the step S25.

However, at the step S26, if either of the above conditions is not satisfied, the program goes to the step S30 and at the step S30, the value set at the step S25 is changed. The method for such changing of the set value will be explained with reference to FIG. 11.

Figure 11:
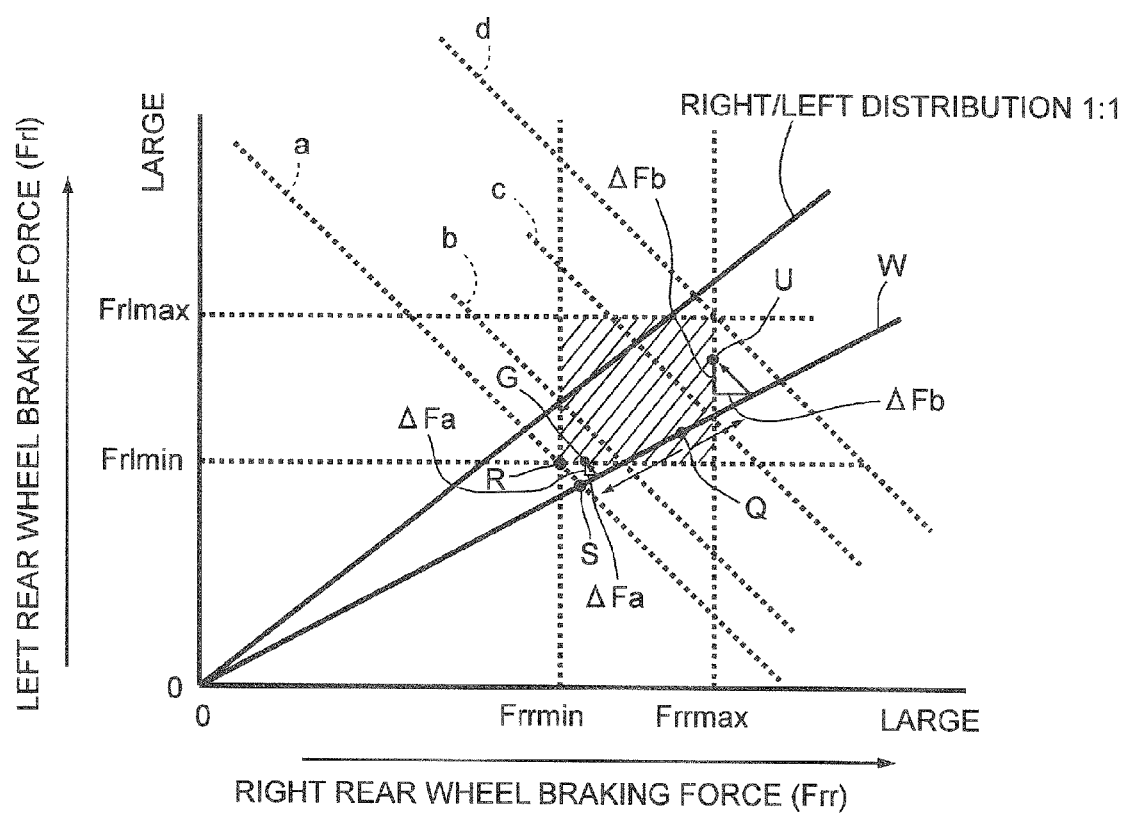
FIG. 11 is a graph showing a distribution state of the braking force at the right/left rear wheels explaining a third embodiment.

The vertical axis of the graph of FIG. 11 indicates the friction braking force Fmrl to be generated at the left rear wheel Wrl and the horizontal axis thereof indicates the friction braking force Fmrr to be generated at the right rear wheel Wrr. The respective values Frlmax and Frrmax indicated on the vertical and horizontal axes indicates the maximum braking force obtained from the friction circle of respective wheels Wrl and Wrr. Respective values of the rear wheel minimum braking forces Frlmin and Frrmin indicated in the graph has been already explained. The four inclined broken lines "a" through "d" in FIG. 11 indicate the constant deceleration lines. The hatched line area in FIG. 11 indicates the area enclosed by respective maximum braking forces Frlmax and Frrmax and respective rear wheel minimum braking forces Frlmin and Frrmin.

Basically the left and right distribution ratio of respective friction braking forces Fmrl and Fmrr may be set to 1:1. However, according to this embodiment, to keep the posture of the vehicle to be in a stable state, depending on the instructions from the brake ECU 10, there occurs an uneven ratio of the braking forces for the left and right wheels. Under such circumference, it is assumed that a point "Q" which makes the distribution uneven to the left and the right wheels as shown in FIG. 11 is designated.

Under such assumption, when the friction braking forces Fmrl and Fmrr of the respective left and right rear wheels Wrl and Wrr are in the area between the respective rear wheel minimum braking forces Frlmin and Frrmin and the respective maximum braking forces Fflmax and Ffrmax allowable to respective left and right rear wheels Wrl and Wrr (within the area between the broken lines "b" and "c"), the setting is made on the distribution ratio line "W" as set at the step S25. Under such condition, for example, when the set value of the regeneration braking force Fcf at the left and right front wheels Wfl and Wfr is increased or decreased (changed), the point "Q" moves along on the distribution ratio line W, keeping the left and right distribution ratio as set.

However, for example, if the regeneration braking force Fcf is increased and the point "Q" is decreased due to such increase of the regeneration braking force Fcf to move to the zone between the broken lines "b" and "a", then the point "Q" goes out of the hatched area and the condition that the braking force is equal to or more than the rear wheel minimum braking force Frlmin of the left rear wheel Wrl is no more satisfied. Under such case, when the point "Q" goes below the broken line "b", the friction braking force ΔFa which is the insufficient amount (shortage or deficient friction braking force short of the minimum friction braking force Frlmin to be generated at the left rear wheel Wrl) due to the decrease is subtracted from the friction braking force at the right rear wheel Wrl (the one of wheels) and the deficient friction braking force ΔFa is added to the left rear wheel Wrl (the other of wheels). Thus the point "Q" moves to the point "G" and then respective friction braking forces Fmrl and Fmrr does not go below the respective rear wheel minimum braking forces Frlmin and Frrmin. Thus, the reliability to the stability of the vehicle can be assured. Further, since the total of the friction braking forces Fmrl and Fmrr moves always along on the constant deceleration line which is in parallel with the broken lines "a" through "d", no uncomfortable feeling is given to the operator of the vehicle during deceleration operation.

It is noted here that when the point "Q" reached at a point on the broken line "b", the point "Q" can be moved to the point "S" on the line "W" taking priority that the point "Q" is kept on the distribution ratio line "W" without cancellation of the restriction to stay on the distribution ratio line "W". After reaching at the point "S", by cancelling the restriction to stay on the distribution ratio line "W", the point "Q" is moved from the point "S" to the point "R". Thereafter the point "Q" is put on a new distribution ratio line (not shown) to be in the area between the minimum braking forces Frmin, Flmin and the maximum braking forces Frmax, Flmax at the right/left rear wheels. The distribution ratio of the left and right rear wheels Wrl and Wrr set as the initial value is assured up to the point S and thereby a good performance can be kept.

Next, the case when the point "Q" moves on the distribution ratio line "W" in a right direction as viewed in FIG. 11 will be explained. In this situation, when the point "Q" moves beyond the position of the maximum braking force Frrmax of the right rear wheel braking force Frr, the braking force ΔFb which is the excess braking force exceeding the maximum braking force Frrmax is subtracted from the right rear wheel Wrr (the one of wheels) and the excess braking force ΔFb exceeding the maximum braking force Frrmax is added to the left rear wheel Wrl (the other of wheels). (See point "U" in FIG. 11). Thus, since respective friction braking forces Fmrl and Fmrr does not exceed respective maximum braking forces Frrmax and Frlmax, both right/left rear wheels Wrr and Wrl would not slip and the vehicle 100 can perform a stable running. Further, since the total of the friction braking forces Fmrl and Fmrr moves always along the constant deceleration line which is in parallel with the broken lines "a" through "d", no uncomfortable feeling is given to the operator of the vehicle during deceleration operation. In such way, respective rear wheel braking forces Fmrl and Fmrr set at the step S25 is changed and the program ends.

As apparent from the above explanation, according to the third embodiment, when respective friction braking forces Fmrl and Fmrr goes out of the range between the respective maximum braking forces Frrmax, Frlmax and the respective rear wheel minimum braking forces Frlmin, Frrmin, the values of the friction braking forces Fmrl and Fmrr are set again so that they are located within the range between the respective maximum braking forces Frrmax, Frlmax and the respective rear wheel minimum braking forces Frlmin and Frrmin. Accordingly, the right/left rear wheel friction braking forces Fmrr and Fmrl are always set between the maximum braking forces Frrmax and Frlmax and the right/left rear wheel minimum braking forces Frrmin and Frlmin. This can assure the gripping force at the right/left rear wheels Wrr and Wrl to thereby obtain a desired braking force Fr. It is noted that when the values of the friction braking forces Fmrl and Fmrr are set again to be within the range between respective maximum braking forces Frrmax and Frlmax and respective rear wheel minimum braking forces Frlmin and Frrmin, such setting is made so that the total of the friction braking forces Fmrl and Fmrr at the left rear wheel Wrl and the right rear wheel Wrr becomes always constant and accordingly, the deceleration is also always constant not to give any uncomfortable feeling to the operator of the vehicle.

Fourth Embodiment

Next, the fourth embodiment will be explained. According to the fourth embodiment, the operation of the friction brake device B differs from the respective friction brake devices B of the first through third embodiments. In detail, in the friction brake device B, when the brake actuator 53 is not operated and the brake pedal 5 is depressed, uniform hydraulic pressure is supplied to respective wheel cylinders WCfl, WCfr, WCrl and WCrr of the corresponding wheels Wfl, Wfr, Wrl and Wrr. The friction braking forces Fmfl, Fmfr, Fmrl and Fmrr corresponding to the uniform hydraulic pressure are generated at the corresponding wheels Wfl, Wfr, Wrl and Wrr. The uniform hydraulic pressure is a pressure corresponding to the depression force of the brake pedal 5 by the operator of the vehicle and is supplied to each wheel cylinder WCfl, WCfr, WCrl and WCrr from the master cylinder 1. In this fourth embodiment, such case is presumed.

Further, according to the fourth embodiment, a braking force control portion 34 is provided which is different in a portion from the braking force control portion 31 of the first embodiment (See FIG. 1). The braking force control portion 34 sets the regeneration braking force Fcf to be generated at the right/left front wheels Wfr and Wfl which is equal to or less than a value obtained by subtracting the total value of the friction braking forces Fmf and Fmr from the required braking force Fd. In this situation, the required braking force Fd is set to be the value equal to or less than the total of the maximum braking forces Fflmax, Ffrmax, Frlmax and Frrmax of the respective wheels Wfl, Wfr, Wrl and Wrr.

Figure 12:
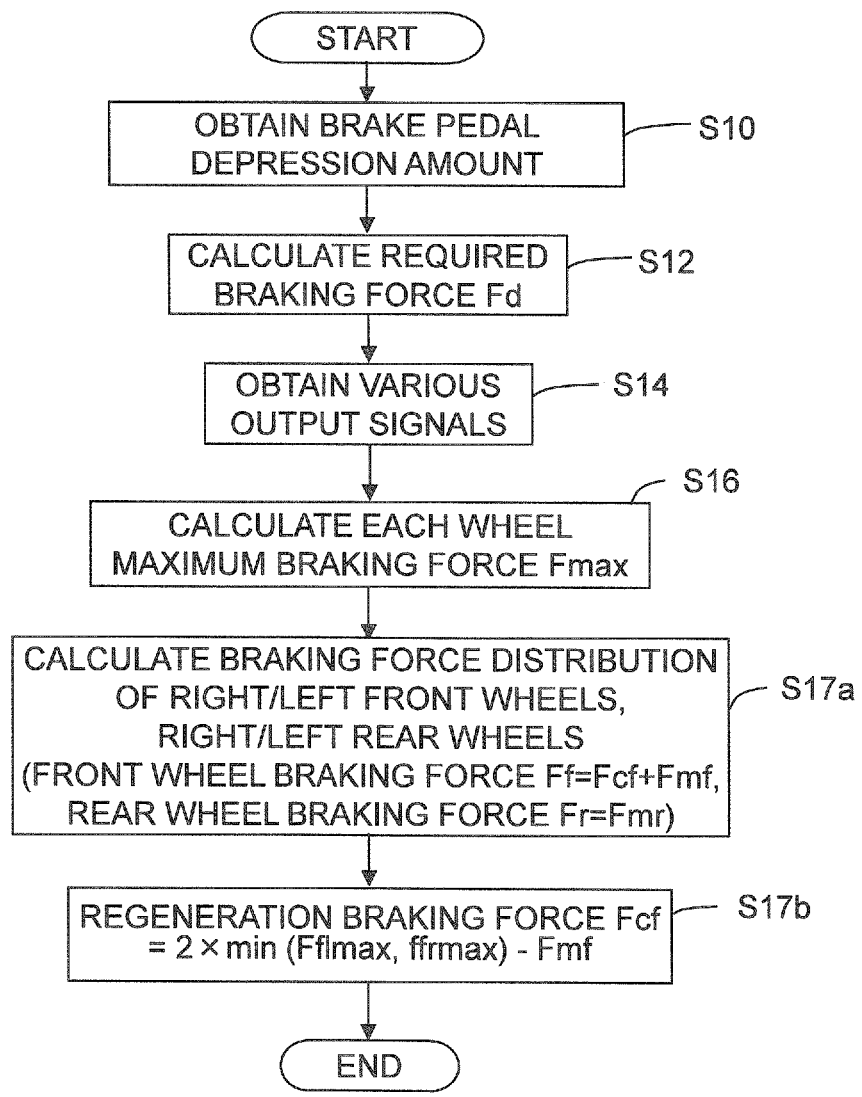
FIG. 12 is a flowchart 4 illustrating a control program to be executed at the brake ECU ("Electronic Control Unit") according to a fourth embodiment.
Figure 13:
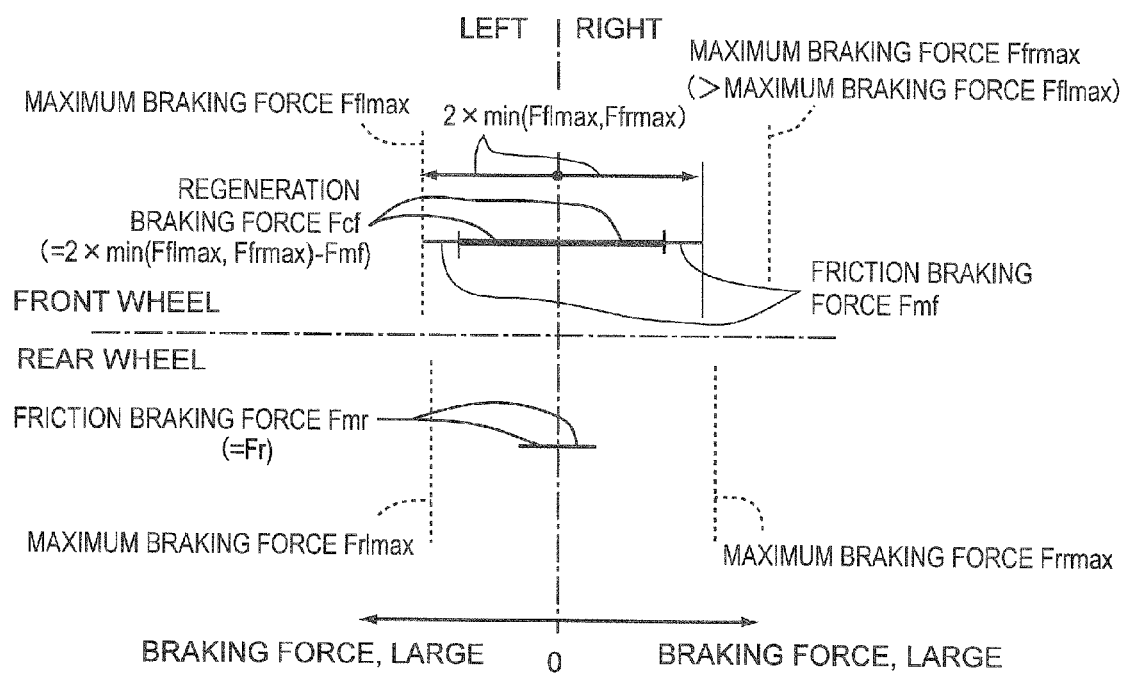
FIG. 13 is a view explaining the state of braking force generated at each wheel by the operation of the flowchart 4.

The operation of the fourth embodiment will be explained with reference to the flowchart 4 in FIG. 12 and the explanation in FIG. 13. FIG. 13 shows the maximum braking forces Flmax, Frmax, Frlmax and Frrmax of the respective wheels Wfl, Wfr, Wrl and Wrr and the braking forces to be generated at the respective wheels Wfl, Wfr, Wrl and Wrr. The flowchart 4 is the same with the flowchart 1 regarding the steps S10 through S16, but the steps S18 and S20 are replaced with the steps S17a and S17b. Therefore, mainly only the changed portions will be explained.

At the step S17a (processing portion of the vehicle motion control portion 30), in order to generate the rear wheel minimum braking force Frmin at the left rear wheel and the right rear wheel Wrl and Wrr, the required braking force Fd is distributed to right/left front wheels Wfr, Wfl and the right/left rear wheels Wrr and Wrl. As explained above, according to the fourth embodiment, the friction braking force Fmf is generated at the right/left front wheels Wfr and Wfl by generating the rear wheel minimum braking force Frmin (rear wheel friction braking force Fmr) at the right/left rear wheels Wrr and Wrl. In other words, the uniform hydraulic pressure is supplied to the respective wheel cylinders WCfr, WCfl, WCrr and WCrl thereby to generate the front wheel friction braking force Fmf and the rear wheel friction braking force Fmr (=Frmin).

At the step S17b (processing portion of the braking force control portion 34), the regeneration braking force Fcf (=Fcfl+Fcfr) to be generated at the left front wheel Wfl and the right front wheel Wfr is set by calculation of "2×min (Fflmax, Ffrmax)−friction braking force Fmf" (See FIG. 13). It is noted that the regeneration braking force Fcf may be smaller than the value obtained by calculation of "2×min (Fflmax, Ffrmax)−friction braking force Fmf". The program ends here.

According to the embodiment explained above, when the operator of the vehicle depresses the brake pedal 5, the respective friction braking forces Fmfl, Fmfr, Fmrl and Fmrr corresponding to the uniform hydraulic pressure applied to the respective wheel cylinders WCfl, WCfr, WCrl and WCrr is generated at the same time. At this time, the regeneration braking force Fcf and the friction braking force Fmf are generated at the left front wheel Wfl and the right front wheel Wfr within a value not to exceed the respctive maximum braking forces Fflmax and Ffrmax at the respective wheels Wfl and Wfr. Accordingly, the necessary gripping force can be assured and at the same time the regeneration energy can be recovered.

It is noted that according to the first through third embodiments, when, for example, the side-slip preventing control (ESC control) is judged to be required by the brake ECU 10, particularly, when the braking force differential ΔFm between the braking forces at the right/left front wheels Wfr and Wfl is require to be generated, a surplus braking force is calculated by subtracting the regeneration braking force Fcf set at the right/left front wheels Wfr and Wfl from the sum of the maximum braking forces Fflmax and Ffrmax at the front wheels. When the surplus braking force is larger than the braking force differential ΔFm and the wheel which has such surplus braking force agrees with the wheel which needs additional braking force, the vehicle stability control is executed by applying the additional friction braking force ΔFm to the wheel which needs the additional braking force by the friction brake device B. When the surplus braking force is less than the braking force differential ΔFm or there is no surplus braking force, the regeneration braking forces Fcfr and Fcfl at the respective right/left front wheels Wfr and Wfl are subtracted by the braking force differential ΔFm worth of regeneration braking force. Thus, by generating the braking force difference ΔFm by applying the friction braking force ΔFm at either one of the wheels Wfl and Wfr by the friction brake device B, the vehicle stability control is executed. Thus, even when the ECS control is executed on the right/left front wheels Wfr and Wfl, the braking forces generated at the right/left front wheels Wfr and Wfl would not exceed the respective maximum braking forces Fflmax and Ffrmax.

It is noted that the friction braking force differential ΔFm generated by the ESC control is calculated based on the yaw rate deviation ΔYto (=Yto−Ya) and ΔYtu (=Ytu−Ya) which is the difference between the actual yaw rate Ya actually measured by the yaw rate sensor 38 and the target yaw rate Yto and Ytu. It is noted here that the method for obtaining the target yaw rate Yto and Ytu is disclosed in Japanese patent publications No. 10 (1998)-24821A and No. 2005-35441A and the explanation thereof will be omitted here. Regarding the method for obtaining the friction braking force differential ΔFm, any method will be applicable and the friction braking force differential ΔFm can be derived from a mapping data obtained and memorized in advance.

It is also noted that the judgment whether or not the ESC control is necessary is made by judging whether or not the absolute values of the yaw rate deviations ΔYto and ΔYtu exceed the ESC intervening reference value. If it is judged that the absolute values of the yaw rate deviations ΔYto and ΔYtu exceeded the intervening reference value, the brake ECU 10 judges that the vehicle 100 is extremely in oversteer or in under steer state and the operation of the ESC control is judged to be necessary. It is noted that the ESC intervening reference value may be determined in any method or to any value and may be selected properly.

The above explanation on the ESC control which starts control operation after detection of a skid condition of the vehicle 100 may be replaced by an explanation on a prediction control system which predicts the state of the vehicle 100 at every elapse of Δt second based on the steering angle of the steering wheel 37*a*, the operating amount of the brake pedal 5, the road surface friction coefficient "μ", etc. to performs control operation.

According to the embodiments explained above, the motor/generator Mg formed by a motor and a generator as a unit is used, but the motor and the generator formed separately may be adapted.

According to the embodiments explained above, the booster of the friction brake device B is used as a hydro booster but instead of the hydro-type, a vacuum booster may be used.

According to the embodiments explained above, as shown in FIG. 2, the conduit system for the brake actuator 53 is a so-called front/rear conduit system. However, it is not limited to this conduit system and a so-called diagonal conduit system may be used, instead.

Further, according to the embodiments explained above, the vehicle 100 is a front wheel drive vehicle and right/left front wheels are the regeneration braking side right/left wheels. It is not limited to this type and the vehicle may be a rear wheel drive vehicle and right/left rear wheels may be the regeneration braking side right/left wheels.

The invention claimed is:

1. A brake controller comprising:
    a friction brake device provided at each wheel of a vehicle for generating a friction braking force at each wheel of the vehicle;
    a regeneration brake device for generating a regeneration braking force which is generated by a generator equipped in the vehicle at regeneration braking side right/left wheels which are one side of right/left front wheels and right/left rear wheels with the same amount at each of the regeneration braking side right/left wheels; and
    an electronic control unit configured to:
    calculate a required braking force corresponding to a deceleration required to the vehicle;
    distribute the required braking force to the regeneration braking side right/left wheels and to non-regeneration braking side right/left wheels which are the other side of the right/left front wheels and the right/left rear wheels;
    calculate a maximum braking force based on a lateral force and a road surface limit friction force generated at each wheel, the maximum braking force corresponding to a maximum allowable braking force applicable to each wheel under a state that a gripping force at each wheel is secured without causing a slipping at each wheel; and
    calculate the regeneration braking force to be generated at the regeneration braking side right/left wheels within a range where the regeneration braking force to be generated at the regeneration braking side right wheel and the regeneration braking force to be generated at the regeneration braking side left wheel do not exceed a smaller maximum braking force between the maximum braking forces applicable to the regeneration braking side right/left wheels, based on the required braking force and a distribution of a braking force to the non-regeneration braking side right/left wheels.

2. The brake controller according to claim 1, wherein the electronic control unit sets the regeneration braking force to be generated at the regeneration braking side right/left wheels to a value equal to or less than a value obtained by subtracting a minimum friction braking force calculated by the electronic control unit to be generated by the friction brake device at the non-regeneration braking side right/left wheels from the required braking force.

3. The brake controller according to claim 2, wherein, the electronic control unit controls the friction brake device so that the friction braking force is generated based on a right/left distribution ratio when the right/left distribution ratio of the braking force distributed to the non-regeneration braking side right/left wheels is set to stabilize a posture of the vehicle.

4. The brake controller according to claim 3, wherein the electronic control unit controls the friction braking force so that when the friction braking force to be generated at one of the non-regeneration braking side right/left wheels exceeds the maximum braking force of the one of the non-regeneration braking side right/left wheels, the excess friction braking force exceeding the maximum friction braking force is subtracted from the braking force to be generated at the one of the non-regeneration braking side right/left wheels and is added to the friction braking force to be generated at the other of the non-regeneration braking side right/left wheels and when the friction braking force to be generated at the other of the non-regeneration braking side right/left wheels falls below the minimum friction braking force of the other of the non-regeneration braking side right/left wheels, a deficient friction braking force short of the minimum friction braking force is added to the braking force to be generated at the other of the non-regeneration braking side right/left wheels and is subtracted from the friction braking force to be generated at the one of the non-regeneration braking side right/left wheels.

5. The brake controller according to claim 1, wherein, the friction brake device generates the friction braking force which correspond to an equally generated hydraulic pressure which is generated equally at each of the non-regeneration braking side right/left wheels and each of the regeneration braking side right/left wheels, and wherein the electronic control unit sets the regeneration braking force to be generated at the regeneration braking side right/left wheels to be a value equal to or less than a value obtained by subtracting a sum of each friction braking force from the required braking force.

* * * * *

UNITED STATES PATENT AND TRADEMARK OFFICE
CERTIFICATE OF CORRECTION

PATENT NO. : 9,714,017 B2  
APPLICATION NO. : 14/777986  
DATED : July 25, 2017  
INVENTOR(S) : Takahiro Okano et al.

Page 1 of 1

It is certified that error appears in the above-identified patent and that said Letters Patent is hereby corrected as shown below:

On the Title Page

Item (73) Assignees, 2nd Assignee: change "Toyota Jidoshi Kabushiki Kaisha" to -- TOYOTA JIDOSHA KABUSHIKI KAISHA --

Signed and Sealed this  
Eleventh Day of September, 2018

Andrei Iancu  
*Director of the United States Patent and Trademark Office*